US012256076B2

(12) United States Patent
Chen et al.

(10) Patent No.: US 12,256,076 B2
(45) Date of Patent: Mar. 18, 2025

(54) RESIDUAL AND COEFFICIENTS CODING FOR VIDEO CODING

(71) Applicant: BEIJING DAJIA INTERNET INFORMATION TECHNOLOGY CO., LTD., Beijing (CN)

(72) Inventors: Yi-Wen Chen, Beijing (CN); Tsung-Chuan Ma, Beijing (CN); Xiaoyu Xiu, Beijing (CN); Hong-Jheng Jhu, Beijing (CN); Xianglin Wang, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 123 days.

(21) Appl. No.: 17/854,671

(22) Filed: Jun. 30, 2022

(65) Prior Publication Data

US 2022/0329812 A1 Oct. 13, 2022

Related U.S. Application Data

(63) Continuation of application No. PCT/US2020/067355, filed on Dec. 29, 2020.
(Continued)

(51) Int. Cl.
*H04N 19/13* (2014.01)
*H04N 19/169* (2014.01)
(Continued)

(52) U.S. Cl.
CPC .......... *H04N 19/13* (2014.11); *H04N 19/176* (2014.11); *H04N 19/186* (2014.11);
(Continued)

(58) Field of Classification Search
CPC .... H04N 19/13; H04N 19/176; H04N 19/186; H04N 19/1883; H04N 19/46; H04N 19/91
(Continued)

(56) References Cited

U.S. PATENT DOCUMENTS 9,503,750 B2 11/2016 Gao et al.
2013/0301738 A1 11/2013 Kim et al.
(Continued)

OTHER PUBLICATIONS

Beijing Dajia Internet Information Technology Co., Ltd., International Search Report and Written Opinion, PCT/US2020/067355, Apr. 20, 2021, 8 pgs.
(Continued)

*Primary Examiner* — Albert Kir
(74) *Attorney, Agent, or Firm* — Oblon, McClelland, Maier & Neustadt, L.L.P.

(57) ABSTRACT

This application is directed to coding video data including a plurality of transform blocks according to a transform skip mode. Two or more control flags are obtained with the video data to indicate signaling of a Rice parameter for the transform blocks on different hierarchical levels. In accordance with a determination that a first control flag is enabled on a first hierarchical level and a second control flag is enabled on a second hierarchical level lower than the first hierarchical level, entropy coding is performed for a subset of the transform blocks based on a Rice parameter obtained with the video data. In accordance with a determination that the first control flag is enabled and that the second control flag is disabled on the second hierarchical level, entropy coding is performed for the subset of the transform blocks based on a predetermined Rice parameter at the second hierarchical level.

20 Claims, 17 Drawing Sheets

Related U.S. Application Data

(60) Provisional application No. 62/955,347, filed on Dec. 30, 2019.

(51) Int. Cl.
  *H04N 19/176* (2014.01)
  *H04N 19/186* (2014.01)
  *H04N 19/46* (2014.01)
  *H04N 19/91* (2014.01)

(52) U.S. Cl.
  CPC ......... *H04N 19/1883* (2014.11); *H04N 19/46* (2014.11); *H04N 19/91* (2014.11)

(58) Field of Classification Search
  USPC .................................................. 375/240.02
  See application file for complete search history.

(56) References Cited

U.S. PATENT DOCUMENTS

| | | | |
|---|---|---|---|
| 2015/0016537 A1* | 1/2015 | Karczewicz | H04N 19/176 375/240.18 |
| 2016/0050436 A1 | 2/2016 | Liu et al. | |
| 2016/0165234 A1* | 6/2016 | Kim | H04N 19/182 375/240.03 |
| 2017/0064336 A1 | 3/2017 | Zhang et al. | |
| 2017/0078683 A1 | 3/2017 | Seregin et al. | |
| 2022/0159259 A1* | 5/2022 | Fan | H04N 19/593 |
| 2022/0182630 A1* | 6/2022 | Liu | H04N 19/129 |
| 2023/0101189 A1* | 3/2023 | Choi | H03M 7/6005 375/240.26 |
| 2023/0118451 A1* | 4/2023 | Choi | H04N 19/70 375/240.02 |
| 2023/0353785 A1* | 11/2023 | Rusanovskyy | H04N 19/176 |
| 2023/0379500 A1* | 11/2023 | Jhu | H04N 19/60 |

OTHER PUBLICATIONS

Extended European Search Report issued Dec. 22, 2023 in European Application 20910388.6, 10 pages.

Kim, S-H. et al., "RCE2: Test B1. Rice parameter signaling for transform blocks", Joint Collaborative Team on Video Coding (JCT-VC) of ITU-T SG 16 WP 3 and ISO/IEC JTC 1/SC 29/WG 11, Document: JCTVC-O0247, Retrieved from the Internet [URL: HTTP://WFTP3.ITU.INT/AV-ARCH/JCTVC-SITE/], XP030115307, 2013, 17 pages.

Kim, S-H. et al., "RCE2: Test A2. Rice parameter signaling for transform-skip blocks", Joint Collaborative Team on Video Coding (JCT-VC) of ITU-T SG 16 WP 3 and ISO/IEC JTC 1/SC 29/WG 11, JCTVC-O0246, Retrieved from the Internet [URL: HTTP://WFTP3.ITU.INT/AV-ARCH/JCTVC-SITE/], XP030115306, 2013, 14 pages.

Zhang, Z. et al., "CE5-related: On the CC-ALF filtering process", Joint Video Experts Team (JVET), of ITU-T SG 16 WP 3 and ISO/IEC JTC 1/SC 29/WG 11, Document: JVET-Q0165, Retrieved from the Internet [URL: http://phenix.int-evry.fr/jvet/doc_end_user/documents/17_Brussels/wg11/JVET-Q0165-v1.zip], XP030222750, 2019, 7 pages.

Bross, B. et al., "Versatile Video Coding (Draft 7)", Joint Video Experts Team (JVET) of ITU-T SG 16 WP 3 and ISO/IEC JTC 1/SC 29/WG 11, Document: JVET-P2001-vE, Retrieved from the Internet [URL: http://phenix.int-evry.fr/jvet/doc_end_user/documents/17_Brussels/wg11/JVET-Q0165-v1.zip], XP030222750, 2019, 489 pages.

Jhu, H-J. et al., "11 AHG12: Slice based Rice parameter selection for transform skip residual coding", Joint Video Experts Team (JVET) of ITU-T SG 16 WP 3 and ISO/IEC JTC 1/SC 29, Document: JVET-T0089, Retrieved from the Internet [URL: https://jvet-experts.org/doc_end_user/documents/20_Teleconference/wg11/JVET-T0089-v1.zip], XP030293540, 2020, 3 pages.

\* cited by examiner

RESIDUAL AND COEFFICIENTS CODING FOR VIDEO CODING

CROSS-REFERENCE TO RELATED APPLICATIONS

The present application is a continuation application of PCT Patent Application No. PCT/US2020/067355, filed on Dec. 29, 2020, which claims priority to U.S. Provisional Patent Application No. 62/955,347, titled "Residual and Coefficients Coding for Video Coding," filed Dec. 30, 2019, both of which are incorporated by reference in their entireties.

The present application is related to PCT Application No. PCT/US2020/053288, titled "Methods and Apparatus of Residual and Coefficient Coding", filed Sep. 29, 2020, which claims priority to U.S. Provisional Patent Application No. 62/909,079, entitled "Residual and Coefficients Coding for Video Coding" filed Oct. 1, 2019, to U.S. Provisional Patent Application No. 62/911,260, entitled "Residual and Coefficients Coding for Video Coding" filed Oct. 5, 2019, and to 62/911,930, entitled Residual and Coefficients Coding for Video Coding" filed Oct. 7, 2019, all of which are incorporated by reference in their entirety.

TECHNICAL FIELD

The present application generally relates to video data coding and compression, and in particular, to method and system of improvement in residual and coefficient coding for video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to method and system of improvement in residual and coefficient coding for video coding.

In one aspect of this application, a method for decoding video data is implemented at an electronic device. The method includes obtaining, from a bitstream, a plurality of pixels in an image frame. The plurality of pixels correspond to a plurality of transform blocks that are encoded according to a transform skip mode. The method further includes receiving, from the bitstream, a first control flag on a first hierarchical level, and the first control flag indicates signaling of a Rice parameter for the plurality of transform blocks on the first hierarchical level. The method further includes in accordance with a determination that the first control flag is enabled on first hierarchical level, receiving, from the bitstream, a second control flag on a second hierarchical level. The second control flag indicates signaling of a Rice parameter for a subset of the plurality of transform blocks at the second hierarchical level that is lower than the first hierarchical level. The method further includes in accordance with a determination that the first control flag is enabled and that the second control flag is enabled on the second hierarchical level, receiving, from the bitstream, a Rice parameter and performing entropy coding for the subset of the plurality of transform blocks based on the received Rice parameter. The method further includes in accordance with a determination that the first control flag is enabled and that the second control flag is disabled on the second hierarchical level, performing entropy coding for the subset of the plurality of transform blocks based on a predetermined Rice parameter at the second hierarchical level.

In some embodiments, the method further includes in accordance with a determination that the first control flag is disabled, performing entropy coding for the plurality of transform blocks including the subset based on the predetermined Rice parameter.

In some embodiments, the first and second control flags indicate whether signaling of the Rice parameter for chroma components of the subset of the plurality transform blocks is enabled on the first and second hierarchical levels, respectively. In accordance with a determination that the first control flag is enabled on the first hierarchical level, the entropy coding is performed for the chroma components of the subset of the plurality of transform blocks based on the received or predetermined Rice parameter based on the second control flag. Further, in some embodiments, the method includes receiving, from the bitstream, a third control flag on the first hierarchical level, the third control flag indicating signaling of a Rice parameter for the plurality of transform blocks for luma components on the first hierarchical level; and in accordance with a determination that the third control flag is enabled on the first hierarchical level, receiving, from the bitstream, a fourth control flag on the second hierarchical level and performing entropy coding for the luma components of the subset of the plurality of transform blocks according to the fourth control flag. The fourth control flag indicating signaling of a Rice parameter for the luma components of the subset of the plurality of transform blocks at the second hierarchical level.

In another aspect of the application, an electronic device includes one or more processing units, memory and a plurality of programs stored in the memory. The programs, when executed by the one or more processing units, cause the electronic apparatus to perform the methods of decoding video data as described above.

In yet another aspect, a non-transitory computer readable storage medium stores a plurality of programs for execution by an electronic device having one or more processing units. The programs, when executed by the one or more processing units, cause the electronic device to perform the methods of decoding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
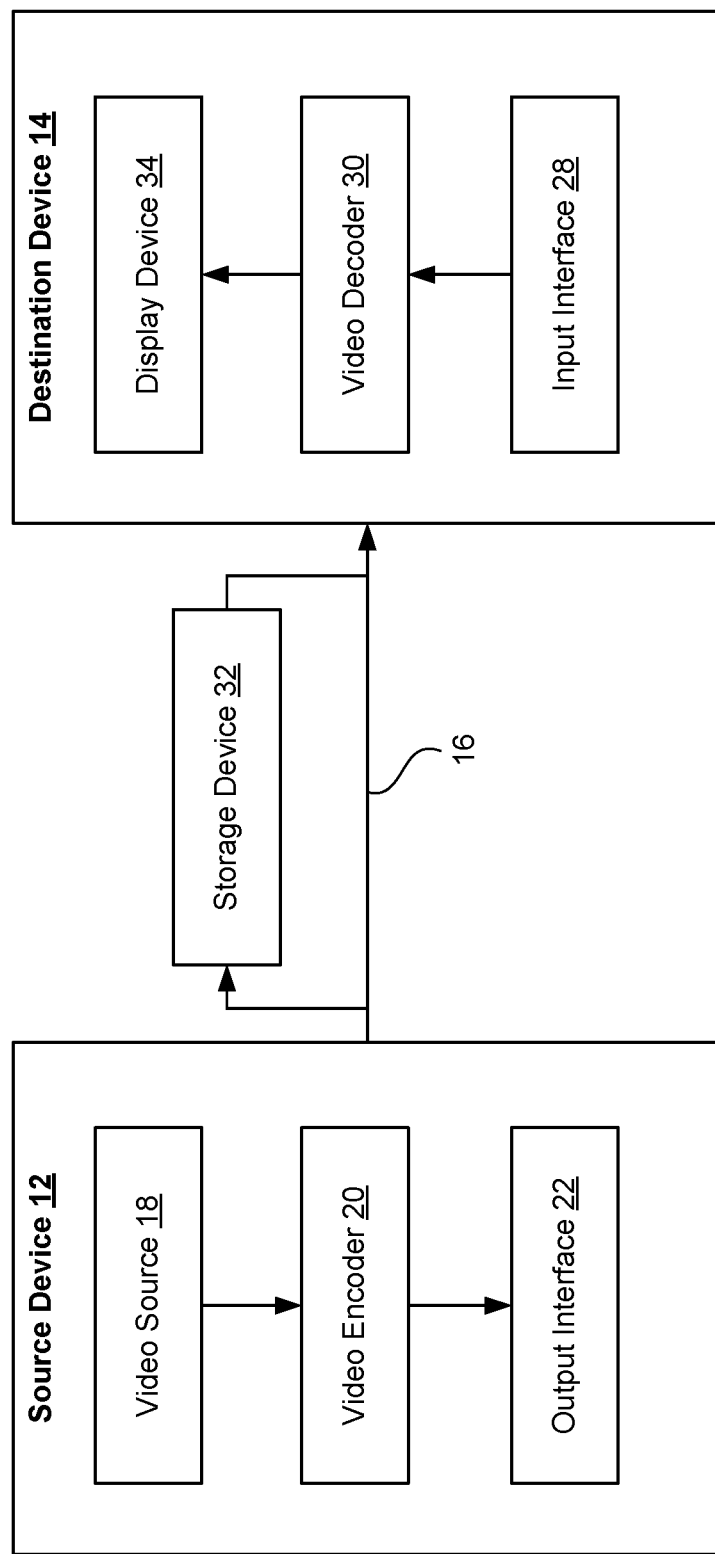
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a web site), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored in a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
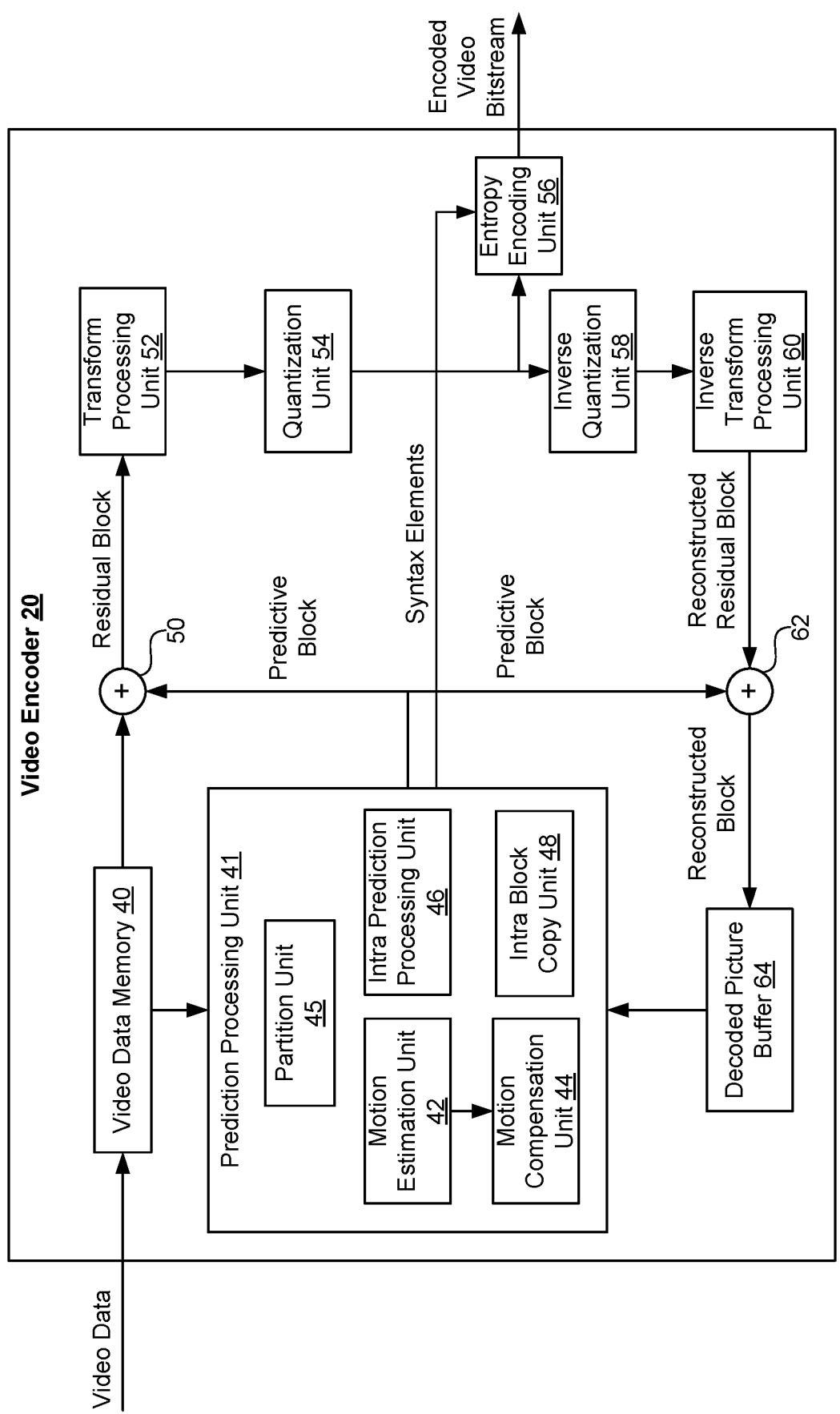
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
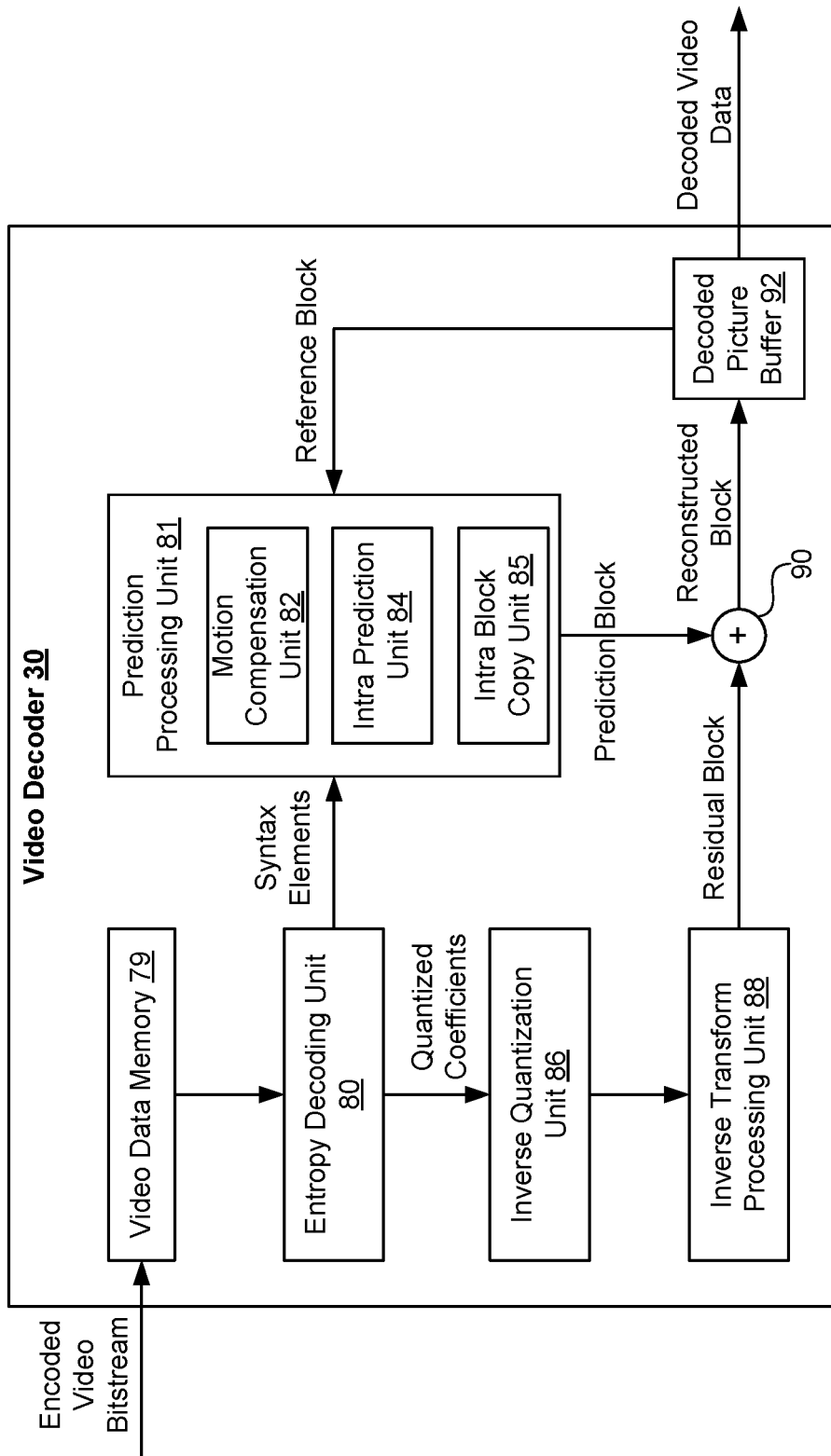
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
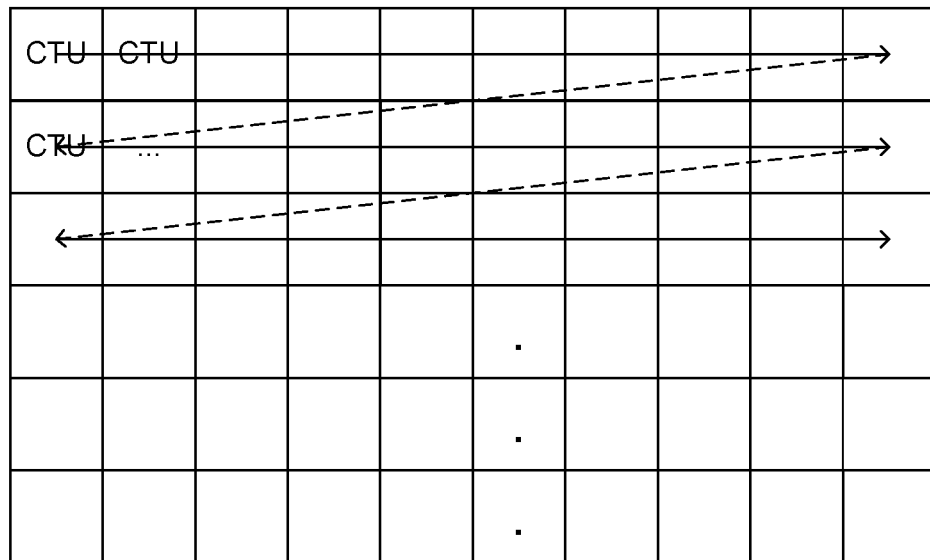
FIGS. 4A through 4E are block diagrams illustrating how a frame is recursively partitioned into multiple video blocks of different sizes and shapes in accordance with some implementations of the present disclosure.
Figure 4B:
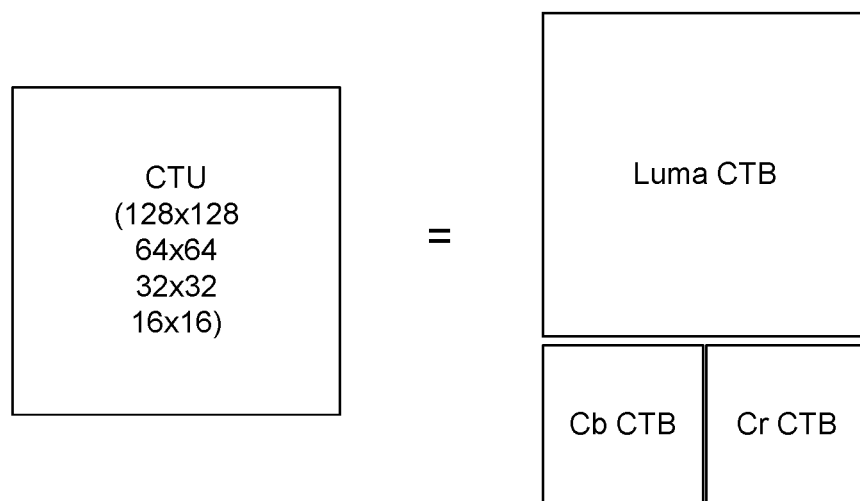

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
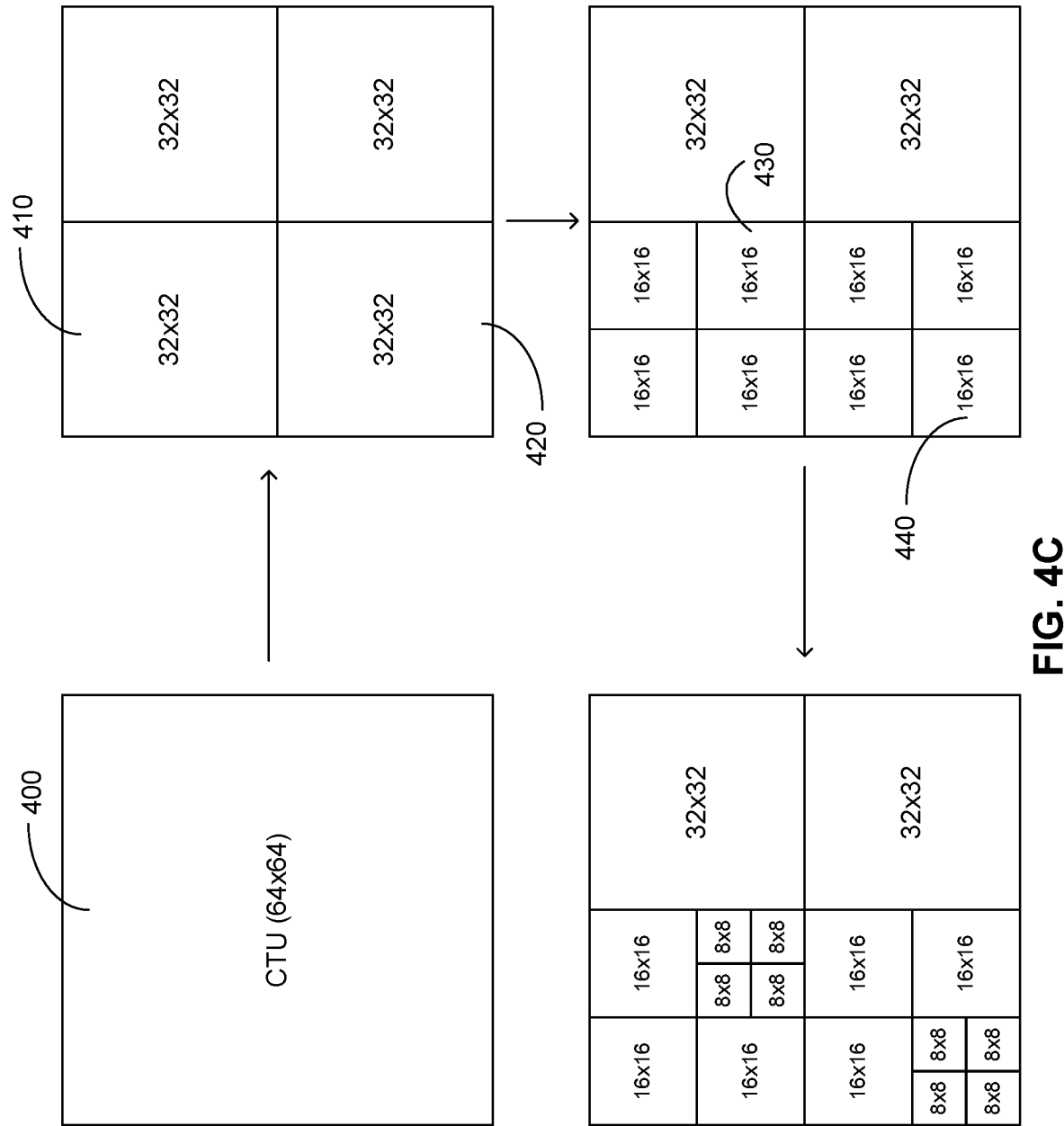
Figure 4D:
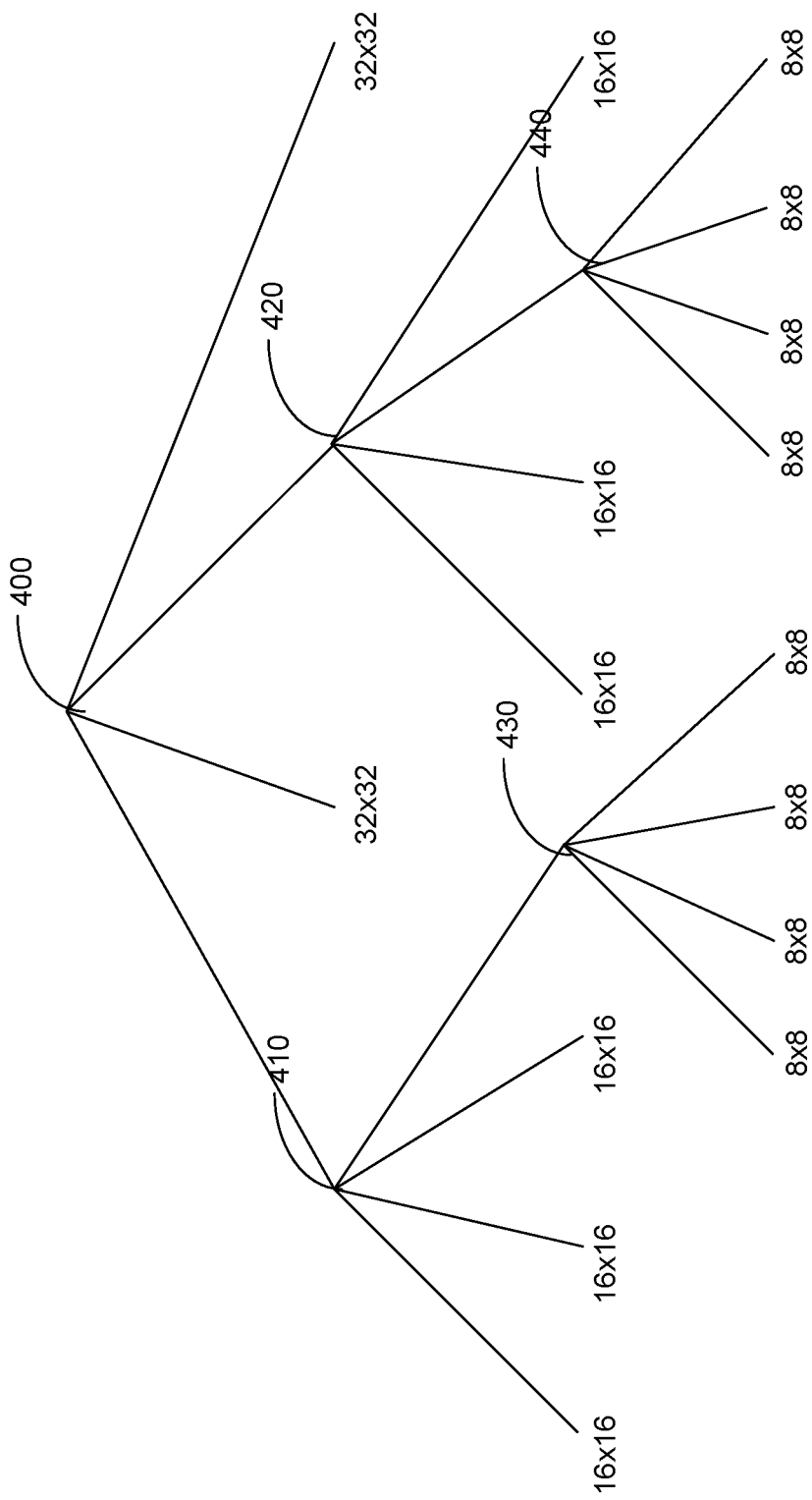
Figure 4E:
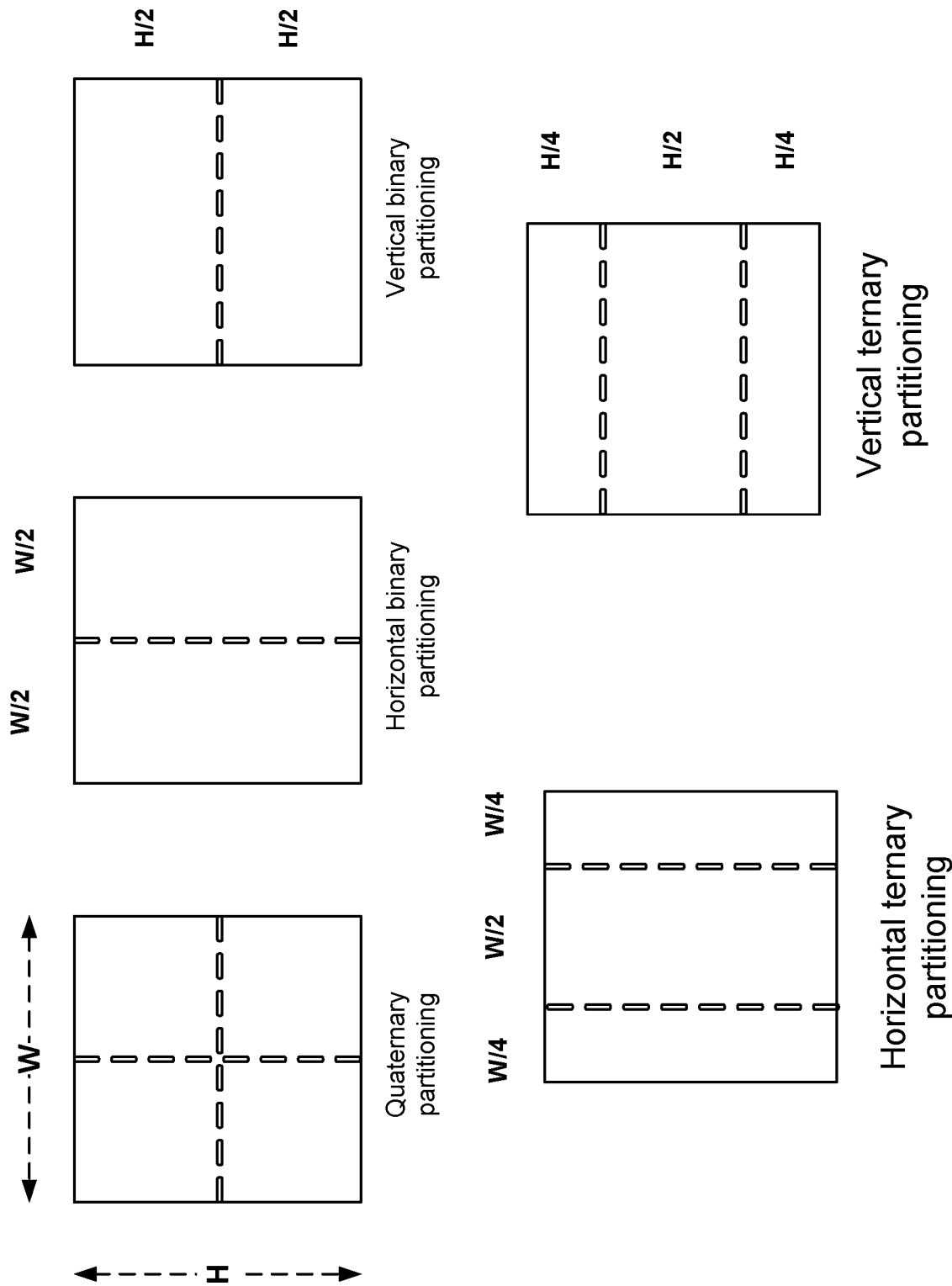

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). Palette-based coding is another coding scheme that has been adopted by many video coding standards. In palette-based coding, which may be particularly suitable for screen-generated content coding, a video coder (e.g., video encoder 20 or video decoder 30) forms a palette table of colors representing the video data of a given block. The palette table includes the most dominant (e.g., frequently used) pixel values in the given block. Pixel values that are not frequently represented in the video data of the given block are either not included in the palette table or included in the palette table as escape colors.

Each entry in the palette table includes an index for a corresponding pixel value that in the palette table. The palette indices for samples in the block may be coded to indicate which entry from the palette table is to be used to predict or reconstruct which sample. This palette mode starts with the process of generating a palette predictor for a first block of a picture, slice, tile, or other such grouping of video blocks. As will be explained below, the palette predictor for subsequent video blocks is typically generated by updating a previously used palette predictor. For illustrative purpose, it is assumed that the palette predictor is defined at a picture level. In other words, a picture may include multiple coding blocks, each having its own palette table, but there is one palette predictor for the entire picture.

To reduce the bits needed for signaling palette entries in the video bitstream, a video decoder may utilize a palette predictor for determining new palette entries in the palette table used for reconstructing a video block. For example, the palette predictor may include palette entries from a previously used palette table or even be initialized with a most recently used palette table by including all entries of the most recently used palette table. In some implementations, the palette predictor may include fewer than all the entries from the most recently used palette table and then incorporate some entries from other previously used palette tables. The palette predictor may have the same size as the palette tables used for coding different blocks or may be larger or smaller than the palette tables used for coding different blocks. In one example, the palette predictor is implemented as a first-in-first-out (FIFO) table including 64 palette entries.

To generate a palette table for a block of video data from the palette predictor, a video decoder may receive, from the encoded video bitstream, a one-bit flag for each entry of the palette predictor. The one-bit flag may have a first value (e.g., a binary one) indicating that the associated entry of the palette predictor is to be included in the palette table or a second value (e.g., a binary zero) indicating that the associated entry of the palette predictor is not to be included in the palette table. If the size of palette predictor is larger than the palette table used for a block of video data, then the video decoder may stop receiving more flags once a maximum size for the palette table is reached.

In some implementations, some entries in a palette table may be directly signaled in the encoded video bitstream instead of being determined using the palette predictor. For such entries, the video decoder may receive, from the encoded video bitstream, three separate m-bit values indicating the pixel values for the luma and two chroma components associated with the entry, where m represents the bit depth of the video data. Compared with the multiple m-bit values needed for directly signaled palette entries, those palette entries derived from the palette predictor only require a one-bit flag. Therefore, signaling some or all palette entries using the palette predictor can significantly reduce the number of bits needed to signal the entries of a new palette table, thereby improving the overall coding efficiency of palette mode coding.

In many instances, the palette predictor for one block is determined based on the palette table used to code one or more previously coded blocks. But when coding the first coding tree unit in a picture, a slice or a tile, the palette table of a previously coded block may not be available. Therefore a palette predictor cannot be generated using entries of the previously used palette tables. In such case, a sequence of palette predictor initializers may be signaled in a sequence parameter set (SPS) and/or a picture parameter set (PPS), which are values used to generate a palette predictor when a previously used palette table is not available. An SPS generally refers to a syntax structure of syntax elements that apply to a series of consecutive coded video pictures called a coded video sequence (CVS) as determined by the content of a syntax element found in the PPS referred to by a syntax element found in each slice segment header. A PPS generally refers to a syntax structure of syntax elements that apply to one or more individual pictures within a CVS as determined by a syntax element found in each slice segment header. Thus, an SPS is generally considered to be a higher level syntax structure than a PPS, meaning the syntax elements included in the SPS generally change less frequently and apply to a larger portion of video data compared to the syntax elements included in the PPS.

Figure 5A:
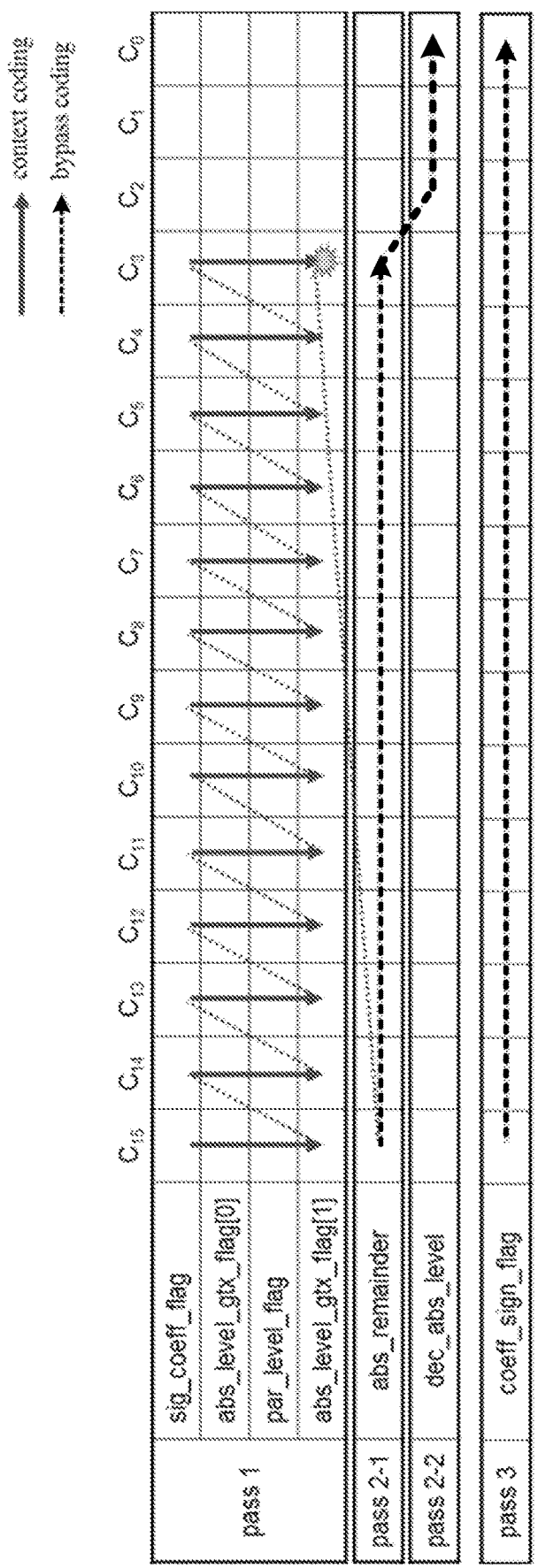
FIGS. 5A through 5B are block diagrams illustrating examples of transform efficient coding using context coding and bypass coding in accordance with some implementations of the present disclosure.
Figure 5B:
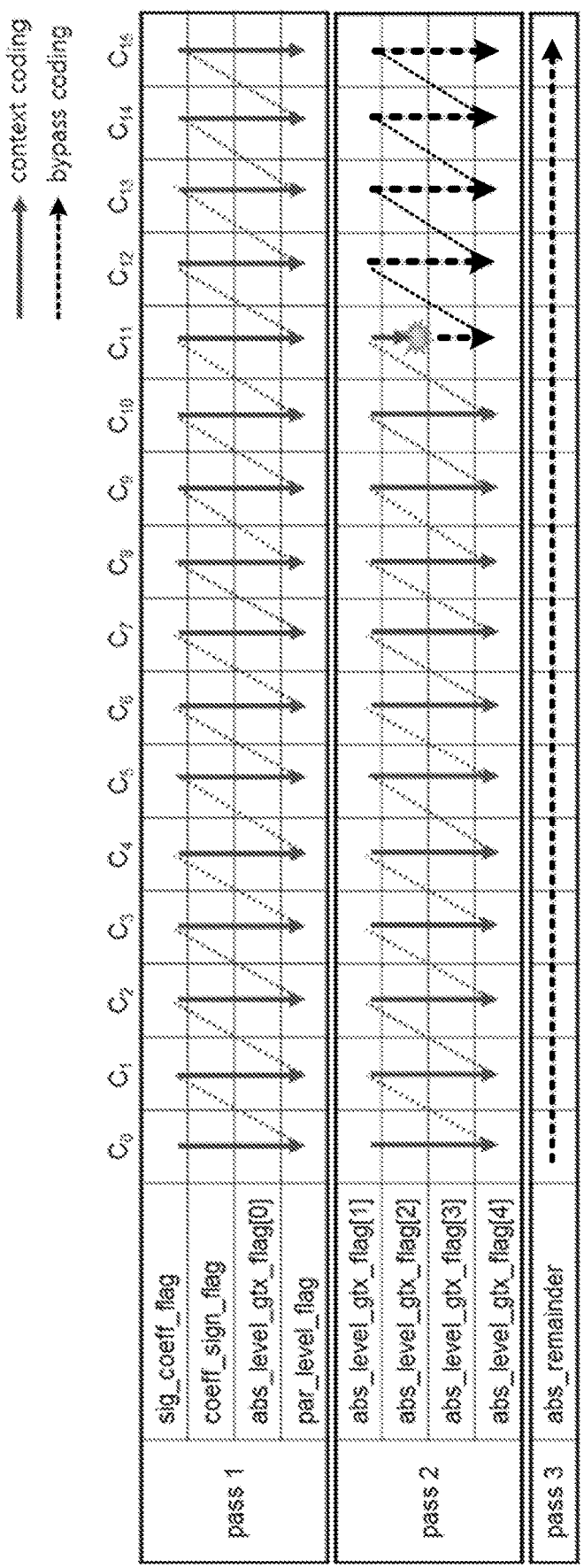

FIGS. 5A through 5B are block diagrams illustrating examples of transform efficient coding using context coding and bypass coding in accordance with some implementations of the present disclosure.

Transform coefficient coding in VVC is similar to that in HEVC because they both use non-overlapped coefficient groups (also called CGs or subblocks). However, there are also some differences between the two schemes. In HEVC, each CG of coefficients has a fixed size of 4×4. In VVC Draft 6, the CG size becomes dependent on the TB size. As a consequence, various CG sizes (1×16, 2×8, 8×2, 2×4, 4×2 and 16×1) are available in VVC. The CGs inside a coding block, and the transform coefficients within a CG, are coded according to pre-defined scan orders.

In order to restrict the maximum number of context-coded bins (CCB) per pixel, the area of a TB and the type of video component (i.e., luma component vs. chroma component) are used to derive the maximum number of context-coded bins (CCB) for the TB. In some embodiments, the maximum number of context-coded bins is equal to TB_zosize*1.75. Here, TB_zosize represents the number of samples within a TB after coefficient zero-out. Note that the coded_sub_block_flag, which is a flag indicating if a CG contains non-zero coefficient or not, is not considered for CCB count.

Coefficient zero-out is an operation performed on a transform block to force coefficients located in a certain region of the transform block to be set to zero. For example, in the current VVC, a 64×64 TB has an associated zero-out operation. As a result, transform coefficients located outside the top-left 32×32 region of the 64×64 TB are all forced to be zero. In fact, in the current VVC, for any transform block with a size over 32 along a certain dimension, coefficient zero-out operation is performed along that dimension to force coefficients located beyond the top-left 32×32 region to be zero.

In transform coefficient coding in VVC, a variable, remBinsPass1, is first set to the maximum number of context-coded bins (MCCB) allowed. During the coding process, the variable is decreased by one each time when a context-coded bin is signaled. While the remBinsPass1 is larger than or equal to four, a coefficient is signaled with syntax elements including sig_coeff_flag, abs_level_gt1_flag, par_level_flag, and abs_level_gt3_flag, all using context-coded bins in the first pass. The rest part of level information of the coefficient is coded with syntax element of abs_remainder using Golomb-Rice code and bypass-coded bins in the second pass. When the remBinsPass1 becomes smaller than four while coding the first pass, a current coefficient is not coded in the first pass, but directly coded in the second pass with the syntax element of dec_abs_level using Golomb-Rice code and bypass-coded bins. After all the above mentioned level coding, the signs (sign_flag) for all scan positions with sig_coeff_flag equal to one is finally coded as bypass bins. Such a process is depicted in FIG. 5A. The remBinsPass1 is reset for every TB. The transition of using context-coded bins for the sig_coeff_flag, abs_level_gt1_flag, par_level_flag, and abs_level_gt3_flag to using bypass-coded bins for the rest coefficients happens at most once per TB. For a coefficient subblock, if the remBinsPass1 is smaller than 4 before coding its very first coefficient, the entire coefficient subblock is coded using bypass-coded bins.

Unlike in HEVC where a single residual coding scheme is designed for coding both transform coefficients and transform skip coefficients, in VVC two separate residual coding schemes are employed for transform coefficients and transform skip coefficients (i.e., residuals), respectively.

For example, it is observed that the statistical characteristics of residuals in transform skip mode are different from those of transform coefficients and there is no energy compaction around low-frequency components. The residual coding is modified to account for the different signal characteristics of the (spatial) transform skip residual which includes:

(1) no signaling of the last x/y position;
(2) coded_sub_block_flag coded for every subblock except for the DC subblock when all previous flags are equal to 0;
(3) sig_coeff_flag context modelling with two neighboring coefficients;
(4) par_level_flag using only one context model;
(5) additional greater than 5, 7, 9 flags;
(6) modified rice parameter derivation for the remainder binarization;
(7) context modeling for the sign flag is determined based on left and above neighboring coefficient values and sign flag is parsed after sig_coeff_flag to keep all context coded bins together;

As shown in FIG. 5B, syntax elements sig_coeff_flag, coeff_sign_flag, abs_level_gt1_flag, par_level_flag, are coded in an interleaved manner from one residual sample to another in the first pass, followed by abs_level_gtX_flag bitplanes in the second pass, and abs_remainder coding in the third pass.

Figure 6:
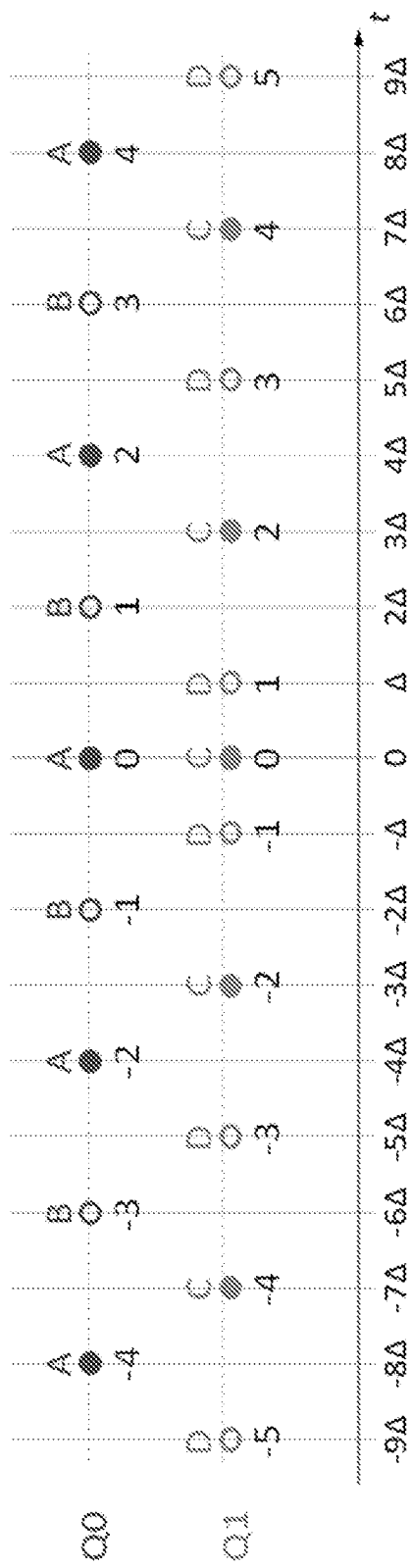
FIG. 6 is a block diagram illustrating an exemplary process of dependent scalar quantization in accordance with some implementations of the present disclosure.

Pass 1: sig_coeff_flag, coeff_sign_flag, abs_level_gt1_flag, par_level_flag
Pass 2: abs_level_gt3_flag, abs_level_gt5_flag, abs_level_gt7_flag, abs_level_gt9_flag
Pass 3: abs_remainder FIG. 6 is a block diagram illustrating an exemplary process of dependent scalar quantization in accordance with some implementations of the present disclosure.

In current VVC, the maximum QP value is extended from 51 to 63, and the signaling of the initial QP is changed accordingly. The initial value of SliceQpY can be modified at the slice segment layer when a non-zero value of slice_qp_delta is coded. For transform skip block, minimum allowed QP is defined as four because quantization step size becomes one when QP is equal to one.

In addition, the scalar quantization used in HEVC is adapted with a new concept called "dependent scalar quantization". Dependent scalar quantization refers to an approach in which a set of admissible reconstruction values for a transform coefficient depends on the values of the transform coefficient levels that precede the current transform coefficient level in reconstruction order. When compared with the conventional independent scalar quantization used in HEVC, the admissible reconstruction vectors are packed denser in the N-dimensional vector space (N represents the number of transform coefficients in a transform block). That is, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

The two scalar quantizers used, denoted by Q0 and Q1, are illustrated in FIG. 6. The location of the available reconstruction levels is uniquely specified by a quantization step size Δ. The scalar quantizer used (Q0 or Q1) is not explicitly signaled in the bitstream. Instead, the quantizer used for a current transform coefficient is determined by the parities of the transform coefficient levels that precede the current transform coefficient in coding or reconstruction order.

Figure 7:
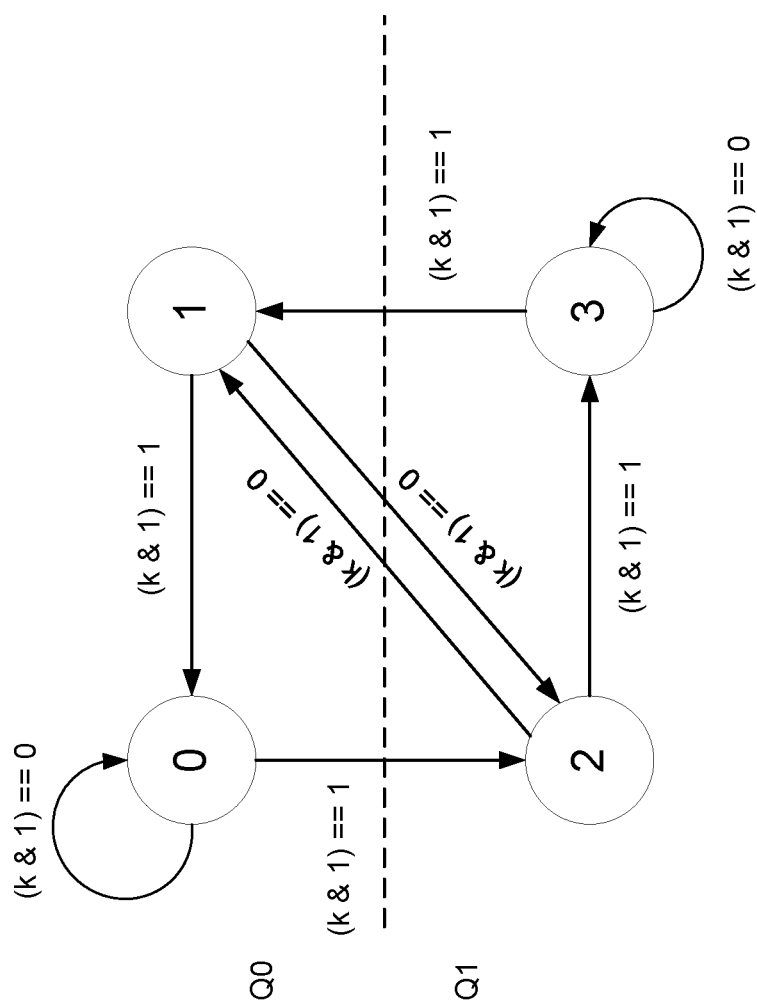
FIG. 7 is a block diagram illustrating an exemplary state machine for switching between two different scalar quantizers in accordance with some implementations of the present disclosure.

FIG. 7 is a block diagram illustrating an exemplary state machine for switching between two different scalar quantizers in accordance with some implementations of the present disclosure.

As illustrated in FIG. 7, the switching between the two scalar quantizers (Q0 and Q1) is realized via a state machine with four quantizer states (QState). The QState can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 7, where k denotes the value of the transform coefficient level.

It is also supported to signal the default and user-defined scaling matrices. The DEFAULT mode scaling matrices are all flat, with elements equal to 16 for all TB sizes. IBC and intra coding modes currently share the same scaling matrices. Thus, for the case of USER_DEFINED matrices, the number of MatrixType and MatrixType_DC are updated as follows:

MatrixType: 30=2 (2 for intra&IBC/inter)×3 (Y/Cb/Cr components)×5 (square TB size: from 4×4 to 64×64 for luma, from 2×2 to 32×32 for chroma)

MatrixType_DC: 14=2 (2 for intra&IBC/inter×1 for Y component)×3 (TB size: 16×16, 32×32, 64×64)+4 (2 for intra&IBC/inter×2 for Cb/Cr components)×2 (TB size: 16×16, 32×32)

The DC values are separately coded for following scaling matrices: 16×16, 32×32, and 64×64. For TBs of size smaller than 8×8, all elements in one scaling matrix are signalled. If the TBs have size greater than or equal to 8×8, only 64 elements in one 8×8 scaling matrix are signalled as a base scaling matrix. For obtaining square matrices of size greater than 8×8, the 8×8 base scaling matrix is up-sampled (by duplication of elements) to the corresponding square size (i.e. 16×16, 32×32, 64×64). When the zeroing-out of the high frequency coefficients for 64-point transform is applied, corresponding high frequencies of the scaling matrices are also zeroed out. That is, if the width or height of the TB is greater than or equal to 32, only left or top half of the coefficients is kept, and the remaining coefficients are assigned to zero. Moreover, the number of elements signalled for the 64×64 scaling matrix is also reduced from 8×8 to three 4×4 submatrices, since the bottom-right 4×4 elements are never used.

The selection of probability models for the syntax elements related to absolute values of transform coefficient levels depends on the values of the absolute levels or partially reconstructed absolute levels in a local neighbourhood.

The selected probability models depend on the sum of the absolute levels (or partially reconstructed absolute levels) in a local neighbourhood and the number of absolute levels greater than 0 (given by the number of sig_coeff_flags equal to 1) in the local neighbourhood. The context modelling and binarization depends on the following measures for the local neighbourhood:

numSig: the number of non-zero levels in the local neighbourhood;

sumAbs1: the sum of partially reconstructed absolute levels (absLevel1) after the first pass in the local neighbourhood;

sumAbs: the sum of reconstructed absolute levels in the local neighbourhood diagonal position (d): the sum of the horizontal and vertical coordinates of a current scan position inside the transform block Based on the values of numSig, sumAbs1, and d, the probability models for coding sig_coeff_flag, abs_level_gt1_flag, par_level_flag, and abs_level_gt3_flag are selected. The Rice parameter for binarizing abs_remainder and dec_abs_level is selected based on the values of sumAbs and numSig.

In current VVC, reduced 32-point MTS (also called RMTS32) is based on skipping high frequency coefficients and used to reduce computational complexity of 32-point DST-7/DCT-8. And, it accompanies coefficient coding changes including all types of zero-out (i.e., RMTS32 and the existing zero out for high frequency components in DCT2). Specifically, binarization of last non-zero coefficient position coding is coded based on reduced TU size, and the context model selection for the last non-zero coefficient position coding is determined by the original TU size. In addition, 60 context models are used to code the sig_coeff_flag of transform coefficients. The selection of context model index is based on a sum of a maximum of five previously partially reconstructed absolute level called locSumAbsPass1 and the state of dependent quantization QState as follows:

If cIdx is equal to 0, ctxInc is derived as follows:

ctxInc=12*Max(0,$Q$State−1)+Min((locSumAbs-Pass1+1)>>1,3)+($d$<2?8:($d$<5?4:0))

Otherwise (cIdx is greater than 0), ctxInc is derived as follows:

ctxInc=36+8*Max(0,$Q$State−1)+Min((locSumAbs-Pass1+1)>>1,3)+($d$<2?4:0)

Figure 8:
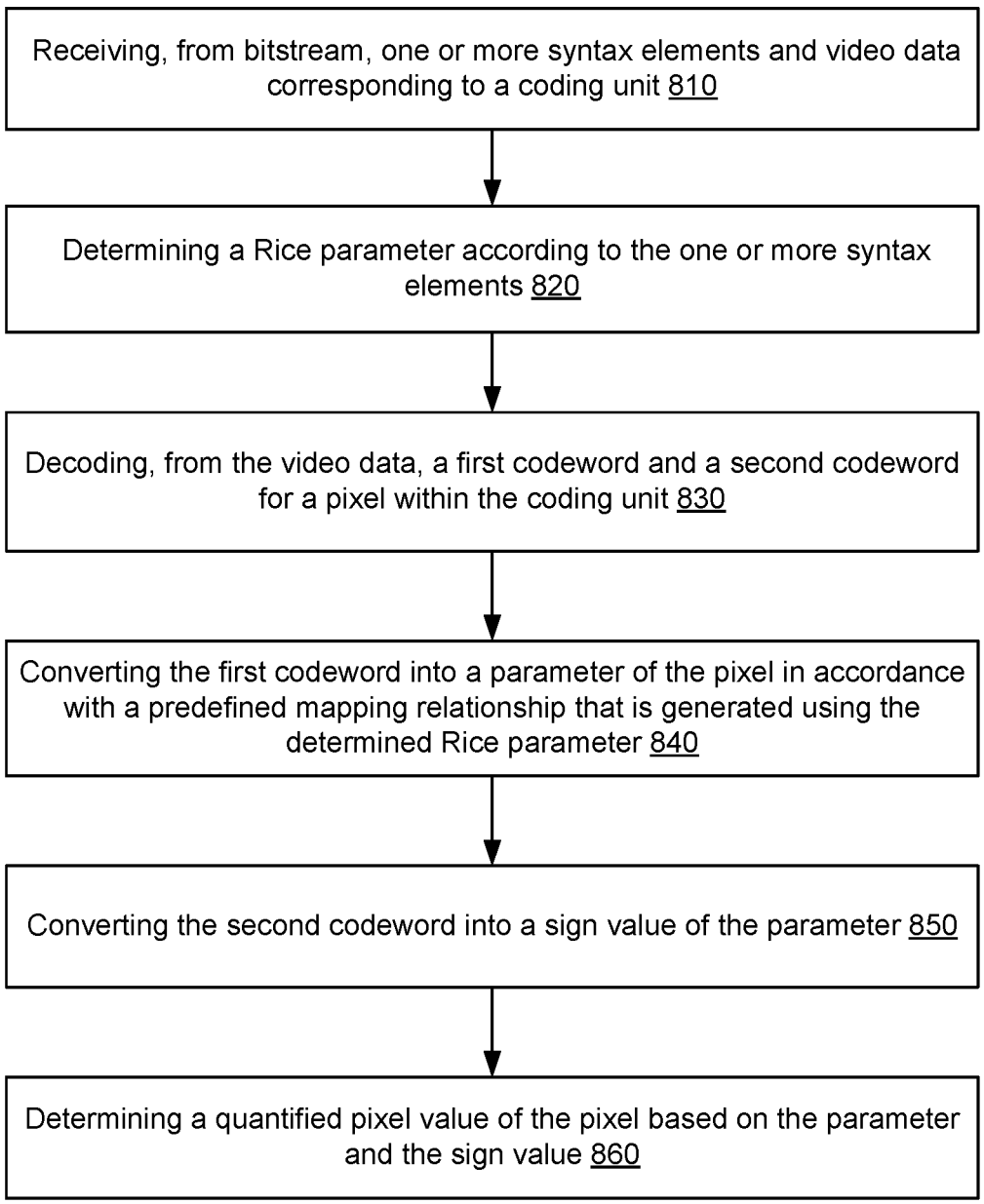
FIG. 8 is a flowchart illustrating exemplary processes by which a video decoder performs residual and coefficient coding for a coding block in accordance with some implementations of the present disclosure.

FIG. 8 is a flowchart 800 illustrating exemplary processes by which a video decoder performs residual and coefficient coding for a coding block in accordance with some implementations of the present disclosure.

In VVC, when coding coefficients (e.g., for transform-skip mode coding block) or residuals (e.g., for transform mode coding block), a unified rice parameter (RicePara) derivation is used for signaling the syntax of abs_remainder and dec_abs_level. The only difference is that the base level, baseLevel, is set to 4 and 0 for coding abs_remainder and dec_abs_level, respectively. Rice parameter is determined based on not only the sum of absolute levels of neighboring five transform coefficients in local template, but also the corresponding base level, as follows:

RicePara=RiceParTable[max(min(31,sumAbs−5*baseLevel),0)]

In other words, the binary codewords for the syntax elements abs_remainder and dec_abs_level are determined adaptively according to the level information of neighboring coefficients. Since this codeword determination is performed for each sample, it requires additional logics to handle this codeword adaptation for coefficients or residual coding.

Similarly, when coding the residual block under transform skip mode, the binary codewords for the syntax elements abs_remainder are determined adaptively according to the level information of neighboring residual samples.

Moreover, when coding the syntax elements related to the residual coding or transform coefficients coding, the selection of probability models depends on the level information of the neighbouring levels, which requires additional logics and additional context models.

In the present disclosure, multiple residual and coefficient decoding processes are presented to address the above-mentioned issues and to improve coding efficiency.

In some embodiments, the video coder uses variable sets of binary codewords for coding certain syntax elements, e.g., abs_remainder, in residual or transform coefficient coding. The video coder selects a particular set of binary codewords according to certain other coded information of the current block, e.g., the quantization parameter (QP) of the transform block/coding block, slice, sequence, CTU, CU, etc., the prediction modes of the CU (e.g., IBC mode or intra or inter), or the slice type (e.g., I slice, P slice or B slice). The video coder may derive the variable sets of binary codewords using one of the exemplary methods listed below:

1. The same procedure for determining the codeword for abs_remainder as used in the current VVC is used, but with different rice parameters.
2. k-th order Exp-Golomb binarization process (EGk)
3. Limited k-th order Exp-Golomb binarization In these exemplary methods mentioned above, the video coder may use different values for the Rice parameter to derive different set of binary codewords for residual or transform coefficient coding. In some embodiments, for a given block of residual samples, the Rice parameters values are determined according to the CU QP, denoted as $QP_{CU}$, instead of the neighboring level information. One specific example is illustrated as shown in Table 1 below, where TH1 to TH4 are predefined thresholds satisfying (TH1<TH2<TH3<Th4), where K0 to K4 are predefined Rice parameters values. It is worth noting that the same logics can be implemented differently in practice. For example, certain equations, or a look-up table, may also be used to derive the same rice parameters, as shown in Table 1, from a QP value of a current CU. In other words, the QP value here serves the dual purposes of defining the quantization level and determining the Rice parameter.

TABLE 1

Rice parameter determination based on QP value

```
if(QP_CU <TH1)
{
   rice parameter = K0
}
else if(QP_CU <TH2)
{
   rice parameter = K1
}
else if(QP_CU <TH3)
{
   rice parameter = K2
}
else if(QP_CU <TH4)
{
   rice parameter = K3
}
else
{
   rice parameter = K4
}
```

It is noted that the set of Rice parameters and corresponding thresholds can be a full set, or a subset of all the Rice parameters and corresponding thresholds associated with the codewords determination for the syntax elements. The set of the Rice parameters and corresponding thresholds can be signaled at different levels in the video bitstream. For example, they can be signaled at sequence level (e.g., sequence parameter set), picture level (e.g., picture parameter set), slice level (e.g., slice header), coding tree unit (CTU) level or coding unit (CU) level.

In one example, the Rice parameter itself used to determine the codewords for coding abs_remainder syntax element in transform skip residual coding is signaled in the slice header, PPS header, and/or SPS header. The signaled Rice parameter is used to determine the codeword for coding the syntax abs_remainder when a CU is coded as transform skip mode and the CU is associated with the above mentioned slice header/PPS/SPS. In some embodiments, the greater the Rice parameter value is, the more uniformly distributed the codeword lengths will be.

In some embodiments, the video coder uses a set of the parameters and corresponding thresholds associated with the codewords determination for the syntax elements of transform coefficients coding and/or transform skip residual coding. And the video coder can use different sets according to whether current block contains luma residual/coefficients or chroma residual/coefficients. The determined codewords are used as binarization codewords when coding the syntax elements through an entropy coder, e.g., arithmetic coding.

For example, the codeword for abs_remainder associated with transform residual coding as used in the current VVC is used for both luma and chroma blocks. To improve the coding process, the video coder can use different fixed Rice parameters for the luma block and chroma block, respectively (e.g., K1 for luma block, K2 for chroma block, where K1 and K2 are integer numbers).

In some embodiments, a set of the parameters values (e.g., K1-K4) and/or thresholds (e.g., TH1-TH4) associated with the codewords determination for the syntax elements of transform coefficients coding and/or transform skip residual coding are signaled into the bitstream, and different sets of parameters values (e.g., K1-K4) and/or thresholds (e.g., TH1-TH4) can be signaled for luma and chroma blocks. The determined codewords are used as binarization codewords when coding the syntax elements through an entropy coder, e.g., arithmetic coding.

To implement the above-mentioned improved process for residual/coefficient decoding, video decoder 30 first receives, from bitstream, one or more syntax elements and video data corresponding to a coding unit (810). Next, video decoder 30 determines a Rice parameter value according to the one or more syntax elements (820).

In some embodiments, video decoder 30 determines the Rice parameter value based on information (e.g., the one or more syntax elements) included in the coding block. For example, the one or more syntax elements include a quantization parameter (QP) and the video coder compares the QP (e.g., $QP_{cu}$) with a set of thresholds (e.g., TH1-TH4), and each threshold has a candidate Rice parameter value (e.g., K0-K4). The video coder determines a pair of thresholds covering the quantization parameter (e.g., $QP_{cu}$ is between TH1 and TH2), and then determines the Rice parameter value as one of the two candidate Rice parameters corresponding to the pair of thresholds as described above. In some embodiments, positive infinity and negative infinity are also considered as implicit thresholds.

In some embodiments, the set of thresholds and the associated candidate Rice parameter values are constant (e.g., predetermined) values stored in the memory of video decoder 30. In other words, rather than receiving these values from the bitstream, video decoder 30 determines these values based on the encoding/decoding specification. The video decoder 30 then determines the Rice parameter value based on the logic described in Table 1.

In some embodiments, the set of thresholds and the associated candidate Rice parameter values are variables carried in the one or more syntax elements of the bitstream. The video decoder 30 then determines these values from information in the bitstream. For example, the video decoder 30 receives, from bitstream, values for K1-K4 and values for TH1-TH4. The video decoder 30 then determines the Rice parameter value based on the logic described in Table 1.

In some embodiments, the one or more syntax elements include the Rice parameter value itself. As a result, video decoder 30 directly receives a value for the Rice parameter from the bitstream. The Rice parameter value may be 1, 2, 3, or other constant values chosen by video encoder 20, e.g., based on the rate-distortion analysis. As a result, the video decoder 30 forgoes the process described in Table 1 as the value for Rice parameter is directly signaled in the bitstream.

The video decoder 30 then decodes, from the video data, a first codeword and a second codeword for a pixel within the coding unit (830). For example, the video decoder 30 converts the first codeword into a parameter of the pixel (e.g., abs_remainder) in accordance with a predefined mapping relationship that is generated using the Rice parameter value determined before (840). The video decoder 30 converts the second codeword into a sign value of the parameter (850). The video decoder 30 determines a quantified pixel value of the pixel based on the parameter and the sign value (860).

In some embodiments, the video decoder 30 uses different syntax elements (e.g., Rice Parameters) for decoding luma component and chroma components of the coding unit. For example, the one or more syntax elements further include a first subset of syntax elements associated with a first component (e.g., luma) of the coding unit and a second subset of syntax elements associated with a second component (e.g., chroma) of the coding unit. As a result, the video coder uses different Rice parameter values and different thresholds for luma and chroma components (e.g., a set of K1-K4 and TH1-TH4 for luma component, a different set of K1-K4 and TH1-TH4 for first chroma component, and a different set of K1-K4 and TH1-TH4 for second chroma component). These different Rice parameter values and thresholds can be determined based on the above-mentioned processed (e.g., they can be predetermined or signaled in the bitstream directly or indirectly via the QP value).

In some embodiments, there is at least one difference between the first subset of syntax elements associated with the first component (e.g., luma) of the coding unit and the second subset of syntax elements associated with the second component (e.g., chroma) of the coding unit.

In some embodiments, the one or more syntax elements are signaled at one level selected from the group consisting of sequence, picture, slice, tile, CTU, CU, transform unit (TU), and transform block (TB). For example, once the video decoder 30 determines the Rice parameter values and/or thresholds at a particular level, all the coding units at or below that level share the same determined Rice parameter values and/or thresholds for decoding.

In some embodiments, the first codeword is associated with coding of a transform coefficient of the pixel in the coding unit (e.g., when the coding unit is encoded using transform mode).

In some embodiments, when the coding unit is a transform-skip mode coding unit, the video decoder 30 decodes, from the video data, a first group of codewords for the pixel within the transform-skip mode coding unit. Next, the video coder derives an initial level value from the first group of codewords; and derives a quantified residual of the pixel from the parameter, the sign value and the initial level value.

In some alternative embodiments, the first codeword is associated with coding of a residual of the pixel in the coding unit (e.g., when the coding unit is encoded using transform-skip mode).

In some embodiments, the predefined mapping relationship is in the form of a lookup table (e.g., as illustrated in Table 1).

In some embodiments, the video decoder 30 generates the predefined mapping relationship by performing the steps of: calculating a binarization parameter using the determined Rice parameter; determining a prefix value of a codeword and an optional suffix value of the corresponding codeword for one of a set of candidate remainder values using the binarization parameter; and repeating said determining step of the codeword for a different one of the set of candidate remainder values until a last one of the set of candidate remainder values is determined.

In some embodiments, the prefix value of the codeword is determined using a truncated Rice binarization process.

In some embodiments, the suffix value of the codeword is determined when the prefix value is equal to a bit string of length 6 with all bits equal to 1.

Figure 9:
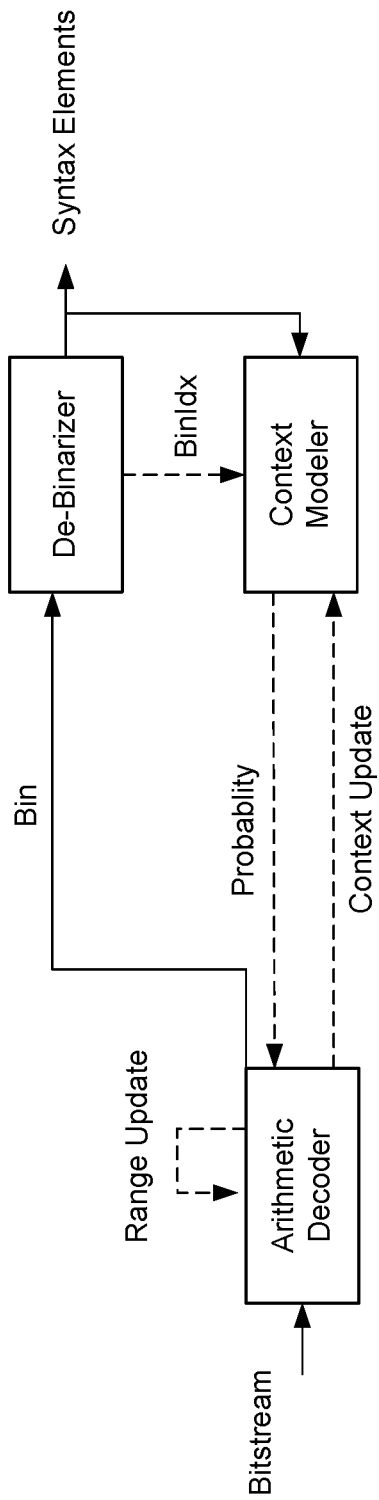
FIG. 9 is a block diagram illustrating an example Context-adaptive binary arithmetic coding (CABAC) engine in accordance with some implementations of the present disclosure.

FIG. 9 is a block diagram illustrating an example Context-adaptive binary arithmetic coding (CABAC) engine in accordance with some implementations of the present disclosure.

Context-adaptive binary arithmetic coding (CABAC) is a form of entropy coding used in many video coding standards, e.g., H.264/MPEG-4 AVC, High Efficiency Video Coding (HEVC) and VVC. CABAC is based on arithmetic coding with a few changes to adapt it to the needs of video coding standards. For example, CABAC codes binary symbols, which keeps the complexity low and allows probability modelling for more frequently used bits of any symbol. Probability models are selected adaptively based on local context, allowing better modelling of probabilities, because coding modes are usually locally well correlated. Finally, CABAC uses a multiplication-free range division by the use of quantized probability ranges and probability states.

CABAC has multiple probability models for different contexts. It first converts all non-binary symbols to binary. Then, for each bin (also termed "bit"), the coder selects which of the probability models to use, then uses information from nearby elements to optimize the probability estimate. Arithmetic coding is finally applied to compress the data.

The context modeling provides estimates of conditional probabilities of the coding symbols. Utilizing suitable context models, a given inter-symbol redundancy can be exploited by switching between different probability models according to already-coded symbols in the neighborhood of the current symbol to encode. Coding a data symbol involves the following stages.

Binarization: CABAC uses Binary Arithmetic Coding which means that only binary decisions (1 or 0) are encoded. A non-binary-valued symbol (e.g., a transform coefficient or motion vector) is "binarized" or converted into a binary code prior to arithmetic coding. This process is similar to the process of converting a data symbol into a variable length code but the binary code is further encoded (by the arithmetic coder) prior to transmission. Stages are repeated for each bin (or "bit") of the binarized symbol.

Context model selection: A "context model" is a probability model for one or more bins of the binarized symbol. This model may be chosen from a selection of available models depending on the statistics of recently coded data symbols. The context model stores the probability of each bin being "1" or "0".

Arithmetic encoding: An arithmetic coder encodes each bin according to the selected probability model. Note that there are just two sub-ranges for each bin (corresponding to "0" and "1").

Probability update: The selected context model is updated based on the actual coded value (e.g., if the bin value was "1", the frequency count of "1"s is increased).

By decomposing each non-binary syntax element value into a sequence of bins, further processing of each bin value in CABAC depends on the associated coding-mode decision, which can be either chosen as the regular or the bypass mode. The latter is chosen for bins, which are assumed to be uniformly distributed and for which, consequently, the whole regular binary arithmetic encoding (and decoding) process is simply bypassed. In the regular coding mode, each bin value is encoded by using the regular binary arithmetic coding engine, where the associated probability model is either determined by a fixed choice, based on the type of syntax element and the bin position or bin index (binIdx) in the binarized representation of the syntax element, or adaptively chosen from two or more probability models depending on the related side information (e.g., spatial neighbors, component, depth or size of CU/PU/TU, or position within TU). Selection of the probability model is referred to as context modeling. As an important design decision, the latter case is generally applied to the most frequently observed bins only, whereas the other, usually less frequently observed bins, will be treated using a joint, typically zero-order probability model. In this way, CABAC enables selective adaptive probability modeling on a sub-symbol level, and hence, provides an efficient instrument for exploiting inter-symbol redundancies at significantly reduced overall modeling or learning costs. Note that for both the fixed and the adaptive case, in principle, a switch from one probability model to another can occur between any two consecutive regular coded bins. In general, the design of context models in CABAC reflects the aim to find a good compromise between the conflicting objectives of avoiding unnecessary modeling-cost overhead and exploiting the statistical dependencies to a large extent.

The parameters of probability models in CABAC are adaptive, which means that an adaptation of the model probabilities to the statistical variations of the source of bins is performed on a bin-by-bin basis in a backward-adaptive and synchronized fashion both in the encoder and decoder; this process is called probability estimation. For that purpose, each probability model in CABAC can take one out of 126 different states with associated model probability values p ranging in the interval [0:01875; 0:98125]. The two parameters of each probability model are stored as 7-bit entries in a context memory: 6 bits for each of the 63 probability states representing the model probability pLPS of the least probable symbol (LPS) and 1 bit for nMPS, the value of the most probable symbol (MPS).

Figure 10:
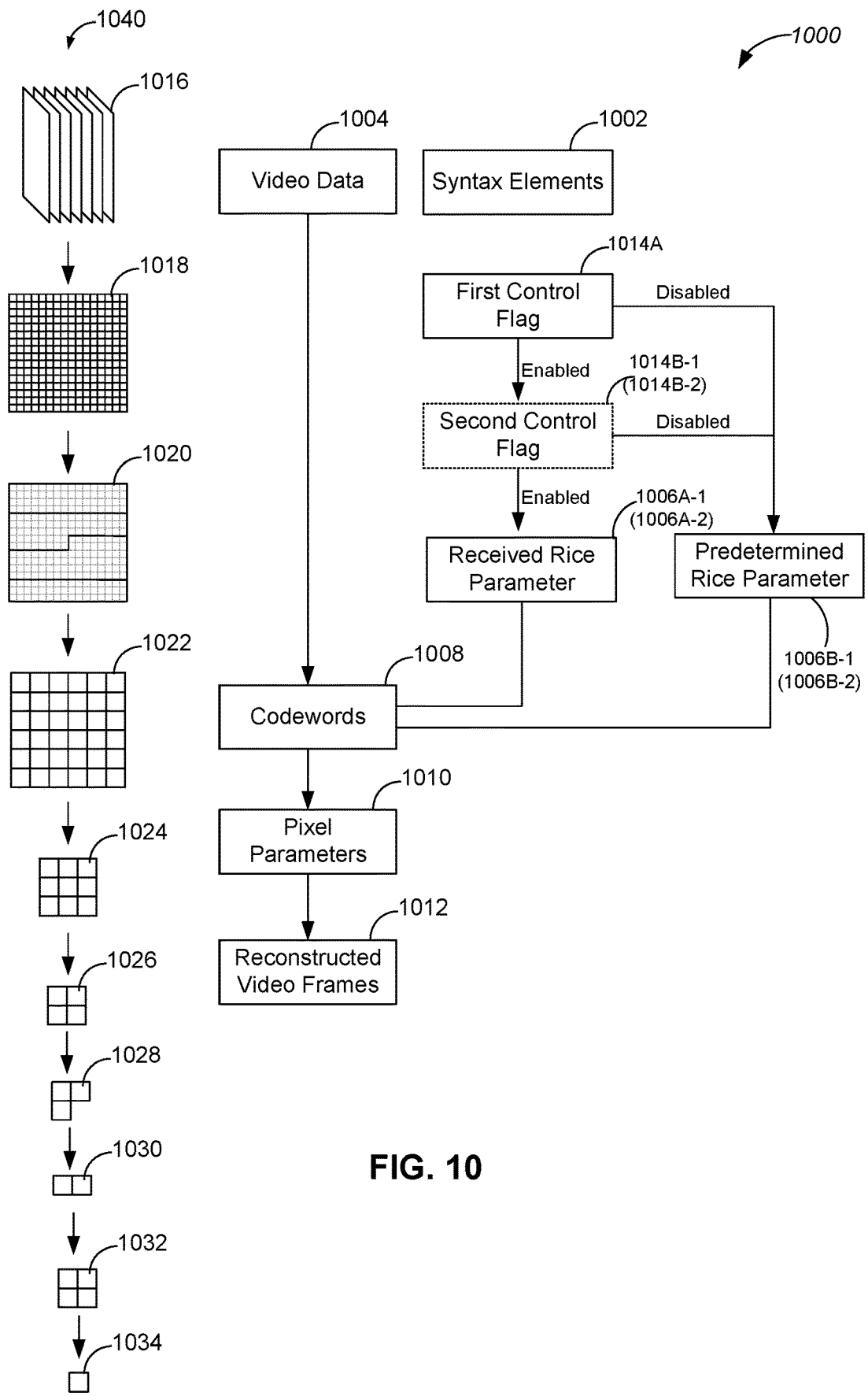
FIG. 10 is a flowchart of a video processing process 1000 involving Rice parameters, in accordance with some embodiments.

FIG. 10 is a flowchart of a video processing process 1000 involving Rice parameters, in accordance with some embodiments. In some embodiments, a bitstream includes one or more syntax elements 1002 and video data 1004 that encoded by a video encoder 20 and sent to a video decoder 30. The video decoder 30 determines a Rice parameter 1006 according to the one or more syntax elements 1002, while decoding, from the video data 1004, one or more codewords 1008 for a pixel within the coding unit. The one or more codewords 1008 are further converted into a pixel parameter 1010 of the pixel in accordance with a predefined mapping relationship that is generated using the determined Rice parameter 1006. The pixel parameter 1010 is converted a quantified pixel value of the pixel that is applied to reconstruct a sequence of video frames 1012. It is noted that Rice parameter 1006 is one of a plurality of parameters and thresholds that can be determined from the one or more syntax elements 1002. In some embodiments, one or more control flags 1014 are sent with the bitstream to indicate whether the Rice parameter 1006 is signaled by the one or more syntax elements 1002. Alternatively, in some embodiments, the one or more syntax elements 1002 include the one or more control flags 1014 for indicating whether the Rice parameter 1006 is signaled by the one or more syntax elements 1002.

The Rice parameter 1006 is signaled at a plurality of hierarchical levels 1040 of the encoded video data 1004. The plurality of hierarchical levels 1040 includes a subset or all of: a sequence level 1016, a picture level 1018, a slice level 1020, a coding tree unit (CTU) level 1022, a coding unit (CU) level 1024, a coding block (CB) level 1026, a prediction unit (PU) level 1028, a prediction block (PB) level 1030, a transform unit (TU) level 1032 and transform block (TB) level 1034. Each of the one or more control flags 1014 corresponds to a respective one of the plurality of hierarchical levels 1040. In some embodiments, the one or more syntax elements 1002 include a sequence parameter set associated with a sequence of pictures, and the sequence parameter set includes a control flag 1014 corresponding to the sequence level 1016. In some embodiments, the one or more syntax elements 1002 include a picture parameter set or picture header associated with a picture, and the picture parameter set or picture header includes a control flag 1014 corresponding to the picture level 1018. In some embodiments, the one or more syntax elements 1002 include a slice header associated with a slice of an image frame, and the slice header includes a control flag 1014 corresponding to the slice level 1020.

In some embodiments, a single control flag 1014 is signalled in a sequence parameter set, picture parameter set or picture header, or slice header to indicate whether signalling of the Rice parameter at a corresponding hierarchical level 1016, 1018 or 1020 is enabled or disabled for a transform skip mode. When the single control flag 1014 is signalled as enabled (e.g. set equal to "1") at the corresponding hierarchical level 1016, 1018 or 1020, an additional syntax element 1002 is further signalled to indicate the Rice parameter of each transform block. When the single control flag 1014 is signalled as disabled (e.g. set equal to "0") at the corresponding hierarchical level 1016, 1018 or 1020, no further syntax element is signalled at a lower level to indicate the Rice parameter for each transform block, and a default Rice parameter (e.g. 1) is used for all the transform blocks for the corresponding transform skip mode. In an example, the Rice parameter is used to determine the codewords 1008 for coding abs_remainder syntax in residual coding of the transform blocks at the transform skip mode, where the transform blocks are included in a corresponding sequence, image or slice associated with the respective hierarchical level 1040.

In some embodiments, two or more control flags 1014 are signalled at different hierarchical levels for the same coding units. In a specific example, the one or more control flags 1014 includes a first control flag 1014A and a second control flag 1014B. The first and second control flags 1014A and 1014B correspond to a first hierarchical level and a second hierarchical level in the hierarchical levels 1040, indicating whether the Rice parameter 1006 is signalled for the first and second hierarchical levels, respectively. The first hierarchical level is higher than the second hierarchical level. For example, the first control flag 1014A corresponds to one of the hierarchical levels 1016-1020, and the second control flag 1014B corresponds to one of the hierarchical levels 1022-1036. When the first control flag 1014A is enabled on the first hierarchical level and the second control flag 1014B is enabled on the second hierarchical level, a Rice parameter 1006A is received from the bitstream and applied to perform entropy coding for a subset of the plurality of transform blocks associated with the second control flag 1014B based on the received Rice parameter 1006A. When the first control flag 1014A is enabled on the first hierarchical level and the second control flag is disabled on the second hierarchical level, entropy coding is performed for the subset of the plurality of transform blocks based on a predetermined Rice parameter 1006B at the second hierarchical level. When the first control flag 1014A is disabled on the first hierarchical level, entropy coding is performed for the subset of transform blocks based on the predetermined Rice parameter 1006B, independently of the second control flag 1014B. As such, when two or more control flags 1014 of different hierarchical levels are applied to the same transform blocks, a control flag of a higher hierarchical level dominates over a control flag of a lower hierarchical level.

In some embodiments, the Rice parameter 1006A is explicitly received as part of the one or more syntax elements 1002 in the bitstream and applied when all of the one or more control flags 1014 at different hierarchical levels are enabled. Alternatively, in some embodiments, a plurality of Rice parameters are predefined and separated stored with different copies at both the encoder 20 and decoder 30, and the Rice parameter 1006A received by the decoder 30 includes a Rice parameter index selecting one of the plurality of predefined and stored Rice parameters. Further, in some embodiments, CABAC coding can be applied to the first N bins of a binary codeword and bypass coding the rest of the bins to pass the Rice parameter 1006 from the encoder 20 to the decoder 30.

In some embodiments, the same procedure for determining a codeword 1008 for abs_remainder as used in the current VVC is used to determine a codeword 1008 for the Rice parameter 1006A. Values of the Rice parameter 1006A are limited to a Rice parameter collection, e.g., {0, 1, 2, 3}, {0, 1, 2} and {0, 1}. Table 1, Table 2 and Table 3 represent three example relationship of Rice parameters and binary codewords 1008 for the Rice parameter collections of {0, 1, 2, 3}, {0, 1, 2} and {0, 1}, respectively. In an example, given a Rice parameter 1006A received with the bit stream (e.g., "1"), a binary codeword (e.g., "01") is determined using truncated binary binarization and according to a mapping relationship (e.g., Table 1). The binary codeword 1008 is further used to perform entropy decoding of the video data 1004.

TABLE 1

First Mapping Relationship of Rice Parameters and Binary Codewords

| Rice Parameter | Binary codeword |
|---|---|
| 0 | 1 |
| 1 | 01 |
| 2 | 001 |
| 3 | 000 |

TABLE 2

Second Mapping Relationship of Rice Parameters and Binary Codewords

| Rice Parameter | Binary codeword |
|---|---|
| 0 | 1 |
| 1 | 01 |
| 2 | 00 |

TABLE 3

Third Mapping Relationship of Rice Parameters and Binary Codewords

| Rice Parameter | Binary codeword |
|---|---|
| 0 | 1 |
| 1 | 0 |

In some embodiments, a set of the parameters and thresholds are used to determine the codewords 1008 for the syntax elements 1002 of transform coefficients coding and/or residual coding at the transform skip mode. These parameters and thresholds are signaled into the bitstream, and different sets can be signaled for luma and chroma blocks. The codewords 1008 are used as binarization codewords when the syntax elements 1002 are coded through an entropy coder (e.g., entropy encoding unit 56 or decoding unit 80), e.g. using arithmetic coding. For example, in some embodiments, entropy coding operations of chroma components and luma components are based on two distinct sets of the Rice parameter 1006A and control flags 1014.

Figure 11:
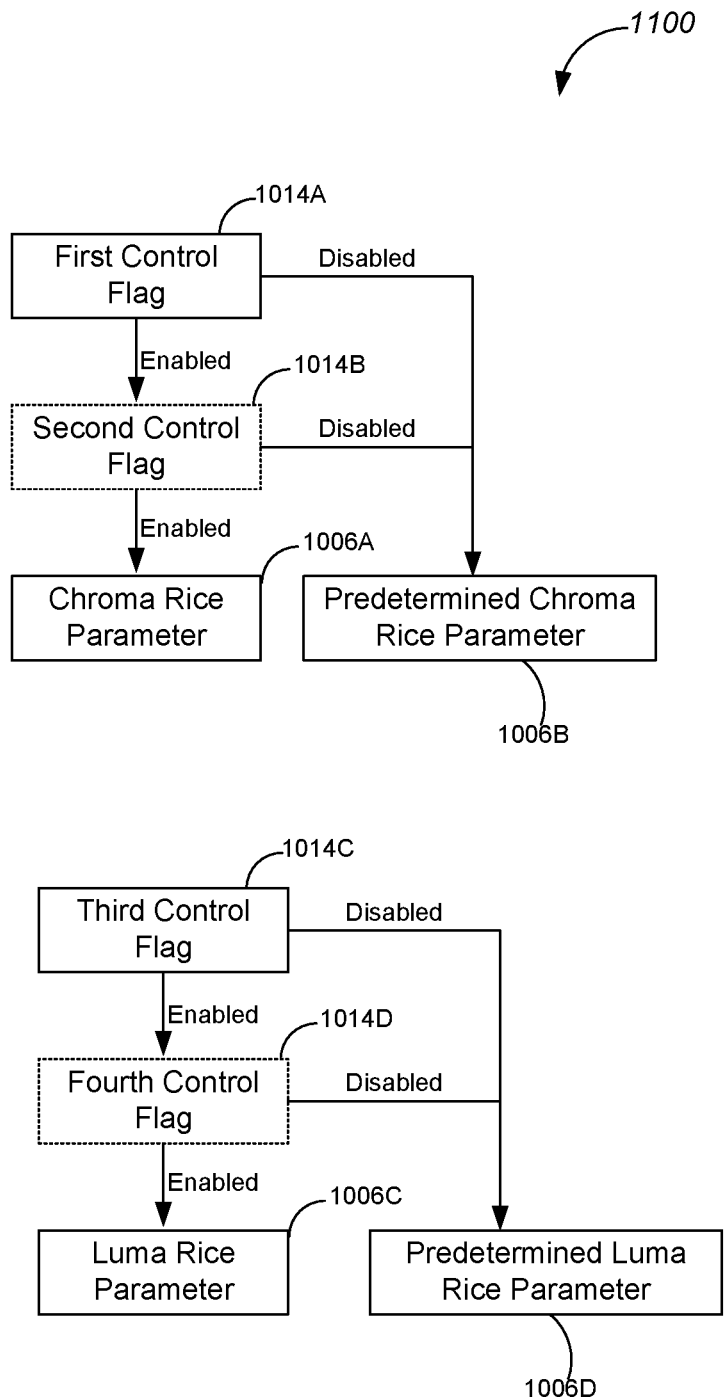
FIG. 11 is a block diagram of a Rice parameter determination system configured to determine Rice parameters for both luma and chroma components of a transform block, in accordance with some embodiments.

FIG. 11 is a block diagram of a Rice parameter determination system 1100 configured to determine Rice parameters for both luma and chroma components of a transform block (TB), in accordance with some embodiments. In some embodiments, each of the chroma and luma components of a TB is associated with a single control flag at a first hierarchical level. For example, two distinct control flags 1014A and 1014C are signaled in a parameter set associated with a first hierarchical level (e.g., in a sequence parameter set, picture parameter set, slice header or picture header) to indicate whether signaling of Rice parameters for the corresponding TBs for chroma and luma components are enabled, respectively. Specifically, when the first control flag 1014A for the chroma components of the TBs is enabled (e.g., set equal to "1"), one syntax element is further signaled for the chroma component of each TB to indicate a chroma Rice parameter 1006A of the TB. When the first control flag 1014A for the chroma components is signaled as disabled (e.g., set equal to "0"), no further syntax element is signaled at any other hierarchical level to indicate the Rice parameter for the chroma component of each TB, and a predetermined chroma Rice parameter 1006B (e.g. 1) is used for chroma components of all of the TBs at the transform skip mode at the first hierarchical level. Likewise, the third control flag 1014C is used to control signaling of the luma Rice parameters 1006C for the luma components of the corresponding TBs, independently of the chroma components of the corresponding TBs.

In some embodiments, each of the chroma and luma components of the TBs is associated with two or more control flags 1014 at different hierarchical levels. For example, the chroma component of a TB is associated with a first control flag 1014A at a respective first hierarchical level and a second control flag 1014B at a respective second hierarchical level, and the luma component of the respective TB is associated with a third control flag 1014C at a respective first hierarchical level and a fourth control flag 1014D at a respective second hierarchical level. The first hierarchical levels of the luma and chroma components are optionally the same or distinct from each other. Likewise, the second hierarchical levels of the luma and chroma components are optionally the same or distinct from each other.

For the chroma component of the TB, a chroma Rice parameter 1006A is obtained and used to perform entropy coding of the chroma component at the transform skip mode, when the first and second control flags 1014A and 1014B corresponding to the chroma component are both enabled. A predetermined chroma Rice parameter 1006B is applied to perform entropy coding of the chroma component of the TB at the transform skip mode, when either of the first and second control flags 1014A and 1014B corresponding to the chroma component is disabled. For the luma component of the TB, a luma Rice parameter 1006C is obtained and used to perform entropy coding of the luma component at the transform skip mode, when a third control flag 1014C and a fourth control flag 1014D corresponding to the luma component are both enabled. Conversely, a predetermined luma Rice parameter 1006D is applied to perform entropy coding of the luma component of the TB at the transform skip mode, when either of the third and fourth control flags 1014C and 1014D corresponding to the luma component is disabled. The chroma Rice parameter 1006A and the luma Rice parameter 1006C are optionally equal to or distinct from each other for the TB. The predetermined chroma and luma Rice parameters 1006B and 1006D optionally equal to or distinct from each other for the TB.

It is noted that in some embodiments, a plurality of Rice parameters are predefined at both the encoder 20 and decoder 30, and the Rice parameter 1006A or 1006C includes a respective Rice parameter index to select one of the plurality of predefined Rice parameters. The Rice parameters 1006A and 1006C can also be explicitly signaled into the bitstream. Binary codewords 1008 of signaled Rice parameters 1006A and 1006C can be formed using different methods as described above.

Figure 12A:
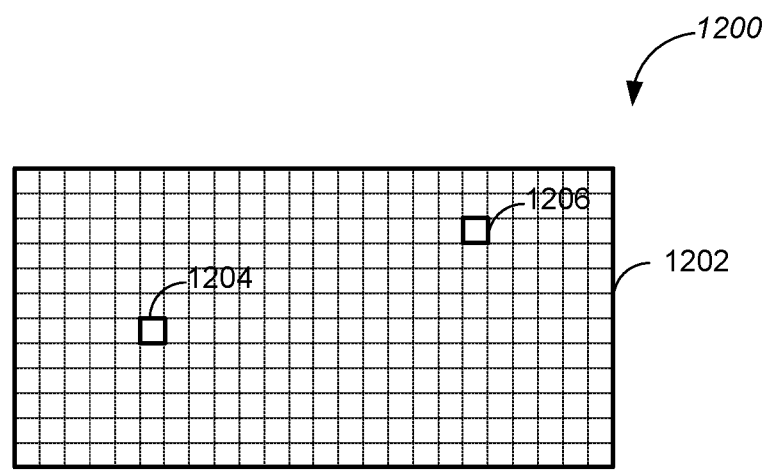
FIG. 12A illustrates a plurality of transform blocks that belong to the same coding unit 122 at a hierarchical level, in accordance with some embodiments.

FIG. 12A illustrates a plurality of transform blocks 1200 that belong to the same coding unit 1202 at a hierarchical level, in accordance with some embodiments. The plurality of transform blocks 1200 includes a first subset of transform blocks 1204, and the received Rice parameter 1006 includes a first Rice parameter 1006A-1 corresponding to the first subset of transform block 1204. The plurality of transform blocks 1200 further includes a second subset of transform blocks 1206 that corresponds to a second Rice parameter 1006A-2. The first and second subset of transform blocks 1204 and 1206 are in the same coding unit 1202 on the second hierarchical level and jointly controlled by the first control flag 1014A and the second control flag 1014B, which are defined at the first and second hierarchical levels, respectively. In accordance with a determination that both of the first and second control flags 1014A and 1014B are enabled, entropy coding is performed on the first and second subsets of transform blocks 1204 and 1206 based on the first and second Rice parameters 1006A-1 and 1006A-2, respectively. In accordance with a determination that the first or second control flag 1014A or 1014B is disabled, entropy coding is performed on the first and second subset of transform blocks 1204 and 1206 based on the same predetermined Rice parameter 1006B.

Figure 12B:
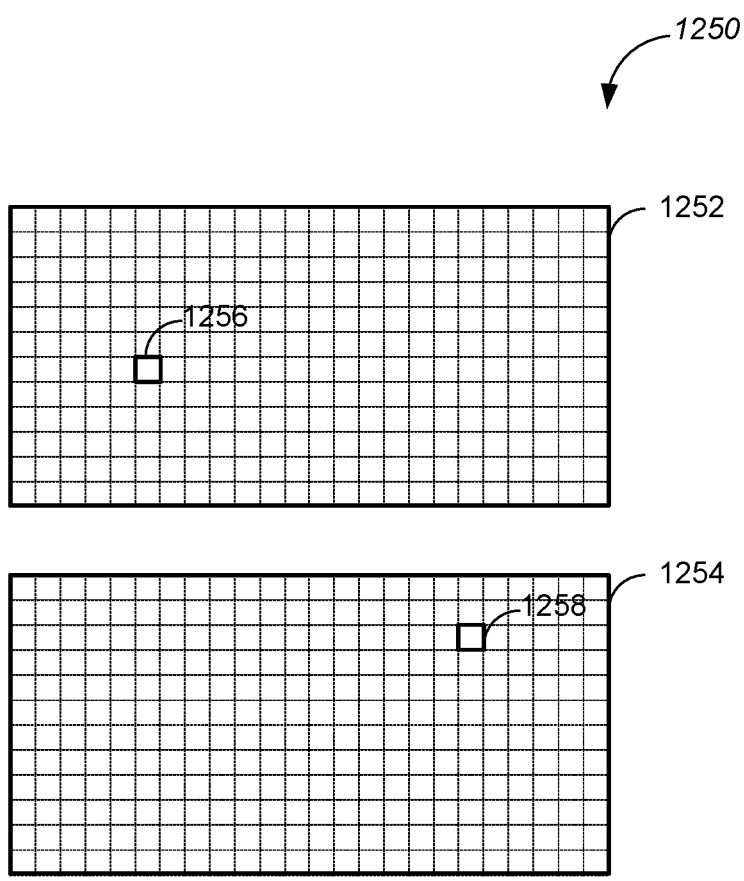
FIG. 12B illustrates a plurality of transform blocks that belong to two distinct coding units of the same hierarchical level, in accordance with some embodiments.

FIG. 12B illustrates a plurality of transform blocks 1250 that belong to two distinct coding units 1252 and 1254 of the same hierarchical level, in accordance with some embodiments. The plurality of transform blocks 1250 includes a first subset of transform blocks 1256 corresponding to a first Rice parameter 1006A-1 on the second hierarchical level, and the plurality of transform blocks 1250 further includes a second subset of transform blocks 1258 corresponding to a second Rice parameter 1006A-2 on the second hierarchical level. The first and second subset of transform blocks 1256 and 1258 are controlled by the first control flag 1014A on the first hierarchical level, and correspond to two distinct second control flags 1014B-1 and 1014B-2 on the second hierarchical level, respectively. In accordance with a determination that both of the first and second control flags 1014A and 1014B-1 are enabled, the electronic device receives the first Rice parameter 1006A-1, and performs entropy coding for the first subset of transform blocks 1256 based on the first Rice parameter 1006A-1. In accordance with a determination that both of the first and second control flags 1014A and 1014B-2 are enabled, the electronic device receives the second Rice parameter 1006A-2, and performs entropy coding for the second subset of transform blocks 1258 based on the second Rice parameter 1006A-2. Stated another way, the transform blocks 1256 and 1258 are controlled jointly by the first control flag 1014A, and however, controlled independently by the second control flags 1014B-1 and 1014B-2 for signaling of Rice parameters.

In accordance with a determination that the first or second control flag 1014A or 1014B-1 is disabled, entropy coding is performed for the first subset of transform blocks 1256 based on a first predetermined Rice parameter 1006B-1. In accordance with a determination that the first or second control flag 1014A or 1014B-2 is disabled, entropy coding is performed for the second subset of transform blocks 1258 based on a second predetermined Rice parameter 1006B-2 that is distinct from the first predetermined Rice parameter 1006B-1. The first and second predetermined Rice parameter 1006B-1 and 1006B-2 are optionally equal to or different from each other.

Figure 13:
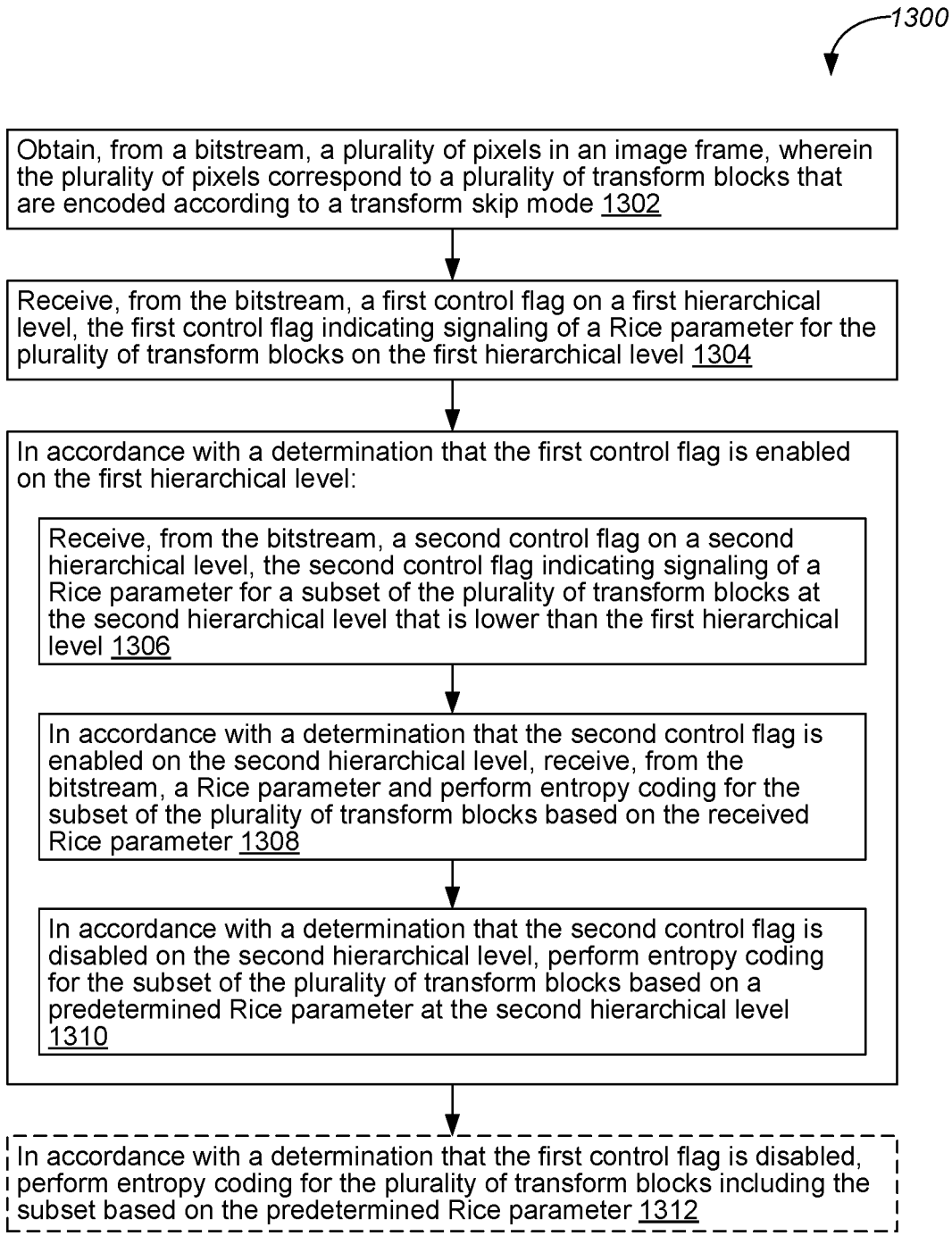
FIG. 13 is a flowchart of a video data decoding method implemented at an electronic device, in accordance with some embodiments.

FIG. 13 is a flowchart of a video data decoding method 1300 implemented at an electronic device, in accordance with some embodiments. A bitstream is obtained (1302) by the electronic device (e.g., having a video decoder 30) and includes (1302) a plurality of pixels in an image frame. The plurality of pixels correspond to a plurality of transform blocks that are encoded according to a transform skip mode. The electronic device receives (1304), from the bitstream, a first control flag 1014A on a first hierarchical level. The first control flag 1014A indicates signaling of a Rice parameter for the plurality of transform blocks on the first hierarchical level. In accordance with a determination that the first control flag 1014A is enabled on the first hierarchical level, the electronic device receives (1306), from the bitstream, a second control flag 1014B on a second hierarchical level. The second control flag 1014B indicates signaling of a Rice parameter for a subset of the plurality of transform blocks at the second hierarchical level that is lower than the first hierarchical level. In accordance with a determination that the first control flag 1014A is enabled on the first hierarchical level and that the second control flag 1014B is enabled on the second hierarchical level, the electronic device receives (1308), from the bitstream, a Rice parameter 1006A and performs entropy coding for the subset of the plurality of transform blocks based on the received Rice parameter 1006A. In accordance with a determination that the first control flag 1014A is enabled on the first hierarchical level and that the second control flag 1014B is disabled on the second hierarchical level, the electronic device performs (1310) entropy coding for the subset of the plurality of transform blocks based on a predetermined Rice parameter 1006B at the second hierarchical level. Conversely, in some embodiments, in accordance with a determination that the first control flag 1014A is disabled, the electronic device performs (1312) entropy coding for the plurality of transform blocks including the subset based on the predetermined Rice parameter, e.g., independently of whether the second control flag is enabled or disabled on the second hierarchical level.

In some embodiments, each of the first and second hierarchical levels is selected from a picture sequence level, picture level, slice level, coding tree unit (CTU) level, coding unit (CU) level, at coding block (CB) level, prediction unit (PU) level, prediction block (PB) level, transform unit (TU) level. In some embodiments, the first control flag 1014A is signaled in a high-level parameter set on the first hierarchical level, and the high-level parameter set includes a sequence parameter set, a picture parameter set, a slice header or picture header based on the first hierarchical level.

In some embodiments, the predetermined Rice parameter 1006B is defined for the subset of the plurality of transform blocks on the second hierarchical level. In some embodiments, the predetermined Rice parameter 1006B is defined for the plurality of transform blocks on the first hierarchical level.

In some embodiments, the predetermined Rice parameter 1006B is obtained with the plurality of transform blocks of the bitstream. Alternatively, in some embodiments, the predetermined Rice parameter 1006B is stored locally at a decoder or encoder configured to perform entropy coding for the subset of the plurality of transform blocks. In some embodiments, the predetermined Rice parameter is equal to "1". In some embodiments, the received Rice parameter is selected from a predefined collection of Rice parameters that is selected from {0, 1, 2, 3}, {0, 1, 2} and {0, 1}.

Referring to FIG. 12A, in some embodiments, the subset of the plurality of transform blocks includes a first subset of transform blocks 1204, and the received Rice parameter includes a first Rice parameter 1006A-1. The plurality of transform blocks further includes a second subset of transform blocks 1206 that corresponds to a second Rice parameter 1006A-2. The first and second subset of transform blocks are in the same coding unit 1202 on the second hierarchical level and jointly controlled by the first control flag 1014A and the second control flag 1014B. In accordance with a determination that both of the first and second control flags 1014A and 1014B are enabled, entropy coding is performed on the first and second subsets of transform blocks 1204 and 1206 based on the first and second Rice parameters 1006A-1 and 1006A-2, respectively. In accordance with a determination that the first or second control flag 1014A or 1014B is disabled, entropy coding is performed on the first and second subset of transform blocks 1204 and 1206 based on the same predetermined Rice parameter 1006B.

Referring to FIG. 12B, in some embodiments, the subset of the plurality of transform blocks includes a first subset of transform blocks 1256 (e.g., corresponding to a first Rice parameter 1006A-1), and the plurality of transform blocks further includes a second subset of transform blocks 1258 (e.g., corresponding to a second Rice parameter 1006A-2 on the second hierarchical level). The first and second subset of transform blocks 1256 and 1258 are controlled by the first control flag 1014A on the first hierarchical level, and correspond to two distinct second control flags 1014B-1 and 1014B-2 on the second hierarchical level, respectively. For each of the transform blocks 1256 and 1258, in accordance with a determination that both of the first and corresponding second control flags 1014A and 1014B-1/1014B-2 are enabled, the electronic device receives a respective Rice parameter 1006A-1 or 1006A-2, and performs entropy coding for the respective subset of transform blocks 1256 or 1258 based on the respective Rice parameter 1006A-1 or 1006A-2. In accordance with a determination that the first or corresponding second control flags 1014A and 1014B-1/1014B-2 is disabled, entropy coding is performed for the respective subset of transform blocks 1256 or 1258 based on a respective predetermined Rice parameter 1006B-1 or 1006B-2. The predetermined Rice parameters 1006B-1 and 1006B-2 are distinct from each other for the first and second subsets of transform blocks 1256 and 1258.

In some embodiments, the first and second control flags 1014A and 1014B indicate whether signaling of the Rice parameter for luma components of the subset of the plurality transform blocks is enabled on the first and second hierarchical levels, respectively. In accordance with a determination that the first control flag 1014A is enabled at the first hierarchical level, the entropy coding is performed for the luma components of the subset of the plurality of transform blocks based on the received or predetermined Rice parameter 1006A or 1006B based on the second control flag 1014B.

In some embodiments, the first and second control flags 1014A and 1014B indicate whether signaling of the Rice parameter for chroma components of the plurality transform blocks is enabled on the first and second hierarchical levels, respectively. In accordance with a determination that the first control flag 1014A is enabled at the first hierarchical level, the entropy coding is performed for the chroma components of the subset of the plurality of transform blocks based on the received or predetermined Rice parameter 1006A or 1006B based on the second control flag. Further, in some embodiments, the electronic device receives, from the bitstream, a third control flag 1014C on the first hierarchical level. The third control flag 1014C indicates signaling of a Rice parameter for the plurality of transform blocks for luma components on the first hierarchical level. In accordance with a determination that the third control flag 1014C is enabled on the first hierarchical level, the electronic device receives, from the bitstream, a fourth control flag 1014D on the second hierarchical level. The fourth control flag 1014D indicates signaling of a Rice parameter for the luma components of the subset of the plurality of transform blocks at the second hierarchical level. Entropy coding is performed for the luma components of the subset of the plurality of transform blocks according to the fourth control flag 1014D.

Additionally, in some embodiments, the third control flag 1014C is controlled independently of the first control flag 1014A on the first hierarchical level, and the fourth control flag 1014D is controlled independently of the second control flag 1014B on the second hierarchical level.

Further, in some embodiments, the received Rice parameter 1006A includes a received chroma Rice parameter 1006A, and the predetermined Rice parameter 1006B includes a predetermined chroma Rice parameter 1006B. In accordance with a determination that the third control flag 1014C is enabled on the first hierarchical level and that the fourth control flag 1014D is enabled on the second hierarchical level, the electronic device receives, from the bitstream, a luma Rice parameter 1006C and performs entropy coding for the luma components of the subset of the plurality of transform blocks based on the received luma Rice parameter 1006C. In accordance with a determination that the third control flag 1014C is enabled on the first hierarchical level and that the fourth control flag 1014D is disabled on the second hierarchical level, the electronic device performs entropy coding for the luma components of the subset of the plurality of transform blocks based on a predetermined luma Rice parameter 1006D at the second hierarchical level.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method for decoding video data, comprising:
   obtaining, from a bitstream, a plurality of pixels in an image frame, wherein the plurality of pixels correspond to a plurality of transform blocks that are encoded according to a transform skip mode;
   receiving, from the bitstream, a first control flag on a first hierarchical level, the first control flag indicating whether a Rice parameter for the plurality of transform blocks is signaled on the first hierarchical level;
   in accordance with a determination that the first control flag is enabled on the first hierarchical level and thus indicating that the Rice parameter for the plurality of transform blocks is signaled:
   receiving, from the bitstream, a second control flag on a second hierarchical level, the second control flag indicating whether a Rice parameter for a subset of the plurality of transform blocks is signaled at the second hierarchical level that is lower than the first hierarchical level;
   in accordance with a determination that the second control flag is enabled on the second hierarchical level and thus indicating that the Rice parameter for the subset of the plurality of transform blocks is signaled, receiving, from the bitstream, a Rice parameter and performing entropy coding for the subset of the plurality of transform blocks based on the received Rice parameter; and
   in accordance with a determination that the second control flag is disabled on the second hierarchical level and thus indicating that the Rice parameter for the subset of the plurality of transform blocks is not signaled, performing entropy coding for the subset of the plurality of transform blocks based on a predetermined Rice parameter at the second hierarchical level.

2. The method of claim 1, further comprising:
   in accordance with a determination that the first control flag is disabled, performing entropy coding for the plurality of transform blocks including the subset based on the predetermined Rice parameter.

3. The method of claim 1, wherein each of the first and second hierarchical levels is selected from a picture sequence level, picture level, slice level, coding tree unit (CTU) level, coding unit (CU) level, at coding block (CB) level, prediction unit (PU) level, prediction block (PB) level, transform unit (TU) level.

4. The method of claim 1, wherein the first control flag is signaled in a high-level parameter set on the first hierarchical level, and the high-level parameter set includes a sequence parameter set, a picture parameter set, a slice header or picture header based on the first hierarchical level.

5. The method of claim 1, wherein the predetermined Rice parameter is defined for the subset of the plurality of transform blocks on the second hierarchical level.

6. The method of claim 1, wherein the predetermined Rice parameter is obtained with the plurality of transform blocks of the bitstream.

7. The method of claim 1, wherein the predetermined Rice parameter is stored locally at a decoder or encoder configured to perform entropy coding for the subset of the plurality of transform blocks.

8. The method of claim 1, wherein the predetermined Rice parameter is equal to "1".

9. The method of claim 1, wherein the received Rice parameter is selected from a predefined collection of Rice parameters, the predefined collection is selected from {0, 1, 2, 3}, {0, 1, 2} and {0, 1}.

10. The method of claim 1, wherein:
the subset of the plurality of transform blocks includes a first subset of transform blocks, and the received Rice parameter includes a first Rice parameter;
the plurality of transform blocks further includes a second subset of transform blocks that corresponds to a second Rice parameter;
the first and second subset of transform blocks are in the same coding unit on the second hierarchical level and jointly controlled by the first control flag and the second control flag;
in accordance with a determination that both of the first and second control flags are enabled, entropy coding is performed on the first and second subsets of transform blocks based on the first and second Rice parameters, respectively; and
in accordance with a determination that the first or second control flag is disabled, entropy coding is performed on the first and second subsets of transform blocks based on the same predetermined Rice parameter.

11. The method of claim 1, wherein:
the subset of the plurality of transform blocks includes a first subset of transform blocks, and the plurality of transform blocks further includes a second subset of transform blocks;
the first and second subset of transform blocks are controlled by the first control flag on the first hierarchical level, and correspond to two distinct second control flags on the second hierarchical level, respectively; and
the method further comprising for each of the first and second subsets of transform blocks:
in accordance with a determination that both of the first and corresponding second control flags are enabled for the respective subset of transform blocks, receiving a respective Rice parameter, and performing entropy coding for the respective subset of transform blocks based on the respective received Rice parameter; and
in accordance with a determination that the first or corresponding second control flag is disabled for the respective subset of transform blocks, performing entropy coding for the respective subset of transform blocks based on a respective predetermined Rice parameter, the predetermined Rice parameters being distinct from each other for the first and second subsets of transform blocks.

12. The method of claim 1, wherein the first and second control flags indicate whether signaling of the Rice parameter for luma components of the subset of the plurality of transform blocks is enabled on the first and second hierarchical levels, respectively, and wherein in accordance with a determination that the first control flag is enabled on the first hierarchical level, the entropy coding is performed for the luma components of the subset of the plurality of transform blocks based on the received or predetermined Rice parameter based on the second control flag.

13. The method of claim 1, wherein the first and second control flags indicate whether signaling of the Rice parameter for chroma components of the subset of the plurality of transform blocks is enabled on the first and second hierarchical levels, respectively, and wherein in accordance with a determination that the first control flag is enabled on the first hierarchical level, the entropy coding is performed for the chroma components of the subset of the plurality of transform blocks based on the received or predetermined Rice parameter based on the second control flag.

14. The method of claim 13, further comprising:
receiving, from the bitstream, a third control flag on the first hierarchical level, the third control flag indicating signaling of a Rice parameter for the plurality of transform blocks for luma components on the first hierarchical level; and
in accordance with a determination that the third control flag is enabled on the first hierarchical level, receiving, from the bitstream, a fourth control flag on the second hierarchical level, the fourth control flag indicating signaling of a Rice parameter for the luma components of the subset of the plurality of transform blocks at the second hierarchical level, and performing entropy coding for the luma components of the subset of the plurality of transform blocks according to the fourth control flag.

15. The method of claim 14, wherein the third control flag is controlled independently of the first control flag on the first hierarchical level, and the fourth control flag is controlled independently of the second control flag on the second hierarchical level.

16. The method of claim 14, the received Rice parameter including a received chroma Rice parameter and the predetermined Rice parameter including a predetermined chroma Rice parameter, wherein performing entropy coding for the luma components of the subset of the plurality of transform blocks further comprises:
in accordance with a determination that the third control flag is enabled on the first hierarchical level:
in accordance with a determination that the fourth control flag is enabled on the second hierarchical level, receiving, from the bitstream, a luma Rice parameter and performing entropy coding for the luma components of the subset of the plurality of transform blocks based on the received luma Rice parameter; and
in accordance with a determination that the fourth control flag is disabled on the second hierarchical level,
performing entropy coding for the luma components of the subset of the plurality of transform blocks based on a predetermined luma Rice parameter at the second hierarchical level.

17. An electronic device, comprising:
one or more processors; and
memory having instructions stored thereon, which when executed by the one or more processors cause the processors to:
obtain, from a bitstream, a plurality of pixels in an image frame, wherein the plurality of pixels correspond to a plurality of transform blocks that are encoded according to a transform skip mode;
receive, from the bitstream, a first control flag on a first hierarchical level, the first control flag indicating whether a Rice parameter for the plurality of transform blocks is signaled on the first hierarchical level;
in accordance with a determination that the first control flag is enabled on the first hierarchical level and thus indicating that the Rice parameter for the plurality of transform blocks is signaled:
receive, from the bitstream, a second control flag on a second hierarchical level, the second control flag indicating whether a Rice parameter for a subset of the plurality of transform blocks is signaled at the second hierarchical level that is lower than the first hierarchical level;

in accordance with a determination that the second control flag is enabled on the second hierarchical level and thus indicating that the Rice parameter for the subset of the plurality of transform blocks is signaled, receive, from the bitstream, a Rice parameter and performing entropy coding for the subset of the plurality of transform blocks based on the received Rice parameter; and in accordance with a determination that the second control flag is disabled on the second hierarchical level and thus indicating that the Rice parameter for the subset of the plurality of transform blocks is not signaled, perform entropy coding for the subset of the plurality of transform blocks based on a predetermined Rice parameter at the second hierarchical level.

18. A non-transitory computer-readable medium storing a bitstream to be decoded by a decoding method comprising:

obtaining, from the bitstream, a plurality of pixels in an image frame, wherein the plurality of pixels correspond to a plurality of transform blocks that are encoded according to a transform skip mode;

receiving, from the bitstream, a first control flag on a first hierarchical level, the first control flag indicating whether a Rice parameter for the plurality of transform blocks is signaled on the first hierarchical level;

in accordance with a determination that the first control flag is enabled on the first hierarchical level and thus indicating that the Rice parameter for the plurality of transform blocks is signaled:

receiving, from the bitstream, a second control flag on a second hierarchical level, the second control flag indicating whether a Rice parameter for a subset of the plurality of transform blocks is signaled at the second hierarchical level that is lower than the first hierarchical level;

in accordance with a determination that the second control flag is enabled on the second hierarchical level and thus indicating that the Rice parameter for the subset of the plurality of transform blocks is signaled, receiving, from the bitstream, a Rice parameter and performing entropy coding for the subset of the plurality of transform blocks based on the received Rice parameter; and in accordance with a determination that the second control flag is disabled on the second hierarchical level and thus indicating that the Rice parameter for the subset of the plurality of transform blocks is not signaled, performing entropy coding for the subset of the plurality of transform blocks based on a predetermined Rice parameter at the second hierarchical level.

19. The method of claim 1, further comprising: determining that the first control flag is enabled on the first hierarchical level as the determination that the first control flag is enabled on the first hierarchical level and thus indicating that the Rice parameter for the plurality of transform blocks is signaled.

20. The method of claim 19, further comprising: determining that the second control flag is enabled on the second hierarchical level as the determination that the second control flag is enabled on the second hierarchical level and thus indicating that the Rice parameter for the subset of the plurality of transform blocks is signaled.

* * * * *